US012524648B1

United States Patent
Kryukov

(10) Patent No.: US 12,524,648 B1
(45) Date of Patent: Jan. 13, 2026

(54) CACHE METHOD AND SYSTEM USING TRAINABLE HASHING

(71) Applicant: Amazon Technologies, Inc., Seattle, WA (US)

(72) Inventor: Evgeny Kryukov, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 1110 days.

(21) Appl. No.: 16/141,436

(22) Filed: Sep. 25, 2018

(51) Int. Cl.
*G06N 3/04* (2023.01)
*G06F 12/0802* (2016.01)
*G06N 3/042* (2023.01)
*G06N 3/08* (2023.01)

(52) U.S. Cl.
CPC ......... *G06N 3/042* (2023.01); *G06F 12/0802* (2013.01); *G06N 3/08* (2013.01)

(58) Field of Classification Search
CPC ........ G06N 3/08; G06N 5/022; G06N 3/0454; G06N 3/04; G06N 3/063; G06N 20/00; G06N 20/10; G06N 7/005; G06N 20/20; G06N 3/0445; G06N 3/084; G06N 5/003; G06N 5/02; G06N 3/006; G06N 3/0436; G06N 3/0472; G06N 5/04; G06N 5/045; G06N 7/023
See application file for complete search history.

(56) References Cited

U.S. PATENT DOCUMENTS

2018/0012110 A1* 1/2018 Souche .................. G06F 16/58
2018/0276495 A1* 9/2018 Yu ........................ G06N 3/0445

FOREIGN PATENT DOCUMENTS

CN 107704265 B 8/2020

OTHER PUBLICATIONS

Liu et al., Learning Short Binary Codes for Large-Scale Image Retrieval, Mar. 2017, IEEE Transactions on Image Processing, vol. 26, No. 3 (Year: 2017).*
Hu et al., Proactive Caching for Spatial Queries in Mobile Environments, 2005 (Year: 2005).*
Falchi et al., Similarity Caching in Large-Scale Image Retrieval, 2012, Information Processing and Management 48 (2012), p. 803-818 (Year: 2012).*

(Continued)

*Primary Examiner* — Van C Mang
(74) *Attorney, Agent, or Firm* — Robert C. Kowert; Kowert, Hood Munyon, Rankin & Goetzel, P.C.

(57) ABSTRACT

Technology is described for an object cache layer for a rules engine. The object cache layer may store derived objects. The object cache layer may take advantage of machine learning for incoming objects that have variable attributes. A trainable hash function may use a machine learning model to predict the incoming event schema and signature of derived objects from the incoming objects or queries. The trainable hash function may determine an incoming event schema and signature of a derived object using the machine learning model and a set of attributes of an incoming object. A cache manager of the object cache layer may use a hash value determined by the trainable hash function using the signature of the incoming object to determine whether to access the derived object in the cache. The trainable hash function may be trained at runtime using training signatures from the rules engine on cache misses.

20 Claims, 12 Drawing Sheets

(56) References Cited

OTHER PUBLICATIONS

Wang et al., Duplicate-Search-Based Image Annotation Using Web-Scale Data, 2012, Proceedings of the IEEE, vol. 100, No. 9, Sep. 2012, pp. 2705-2721 (Year: 2012).*

Minu et al., Semantic Rule Based Image Visual Feature Ontology Creation, 2014 (Year: 2014).*

\* cited by examiner

US 12,524,648 B1

CACHE METHOD AND SYSTEM USING TRAINABLE HASHING

BACKGROUND

A rules system computational model implements a set of rules in a runtime production environment. A rules system may include a software rules engine that executes one or more business rules, where each rule has a condition and a consequential action. One example of an action is derivation of a property, an object, a description of an operation, and the like. The rules engine may apply the rules on data through a series of operations which identify the rules with matching conditions or other logical expressions, and then execute the rules' actions. The rules might come from various sources. The rules engine may form part of a system enabling company policies, regulations, and other operational decisions to be defined, tested, executed, and maintained separately from application code. This allows business people (not typically software engineers) to configure the behavior of the system without requiring a deep understanding the source code.

By providing an alternative computational model, a rules system may simplify maintenance of the corresponding application rules. Yet, processing time may increase as the number of rules increase and running the large number of rules on the data increases the computing operations needed to identify the rules whose conditions match and then execute the rules' actions. Additionally, load, processing time, and network utilization (if network calls are used) may increase as rules and interactions between multiple rules become more complex.

DETAILED DESCRIPTION

Figure 1:
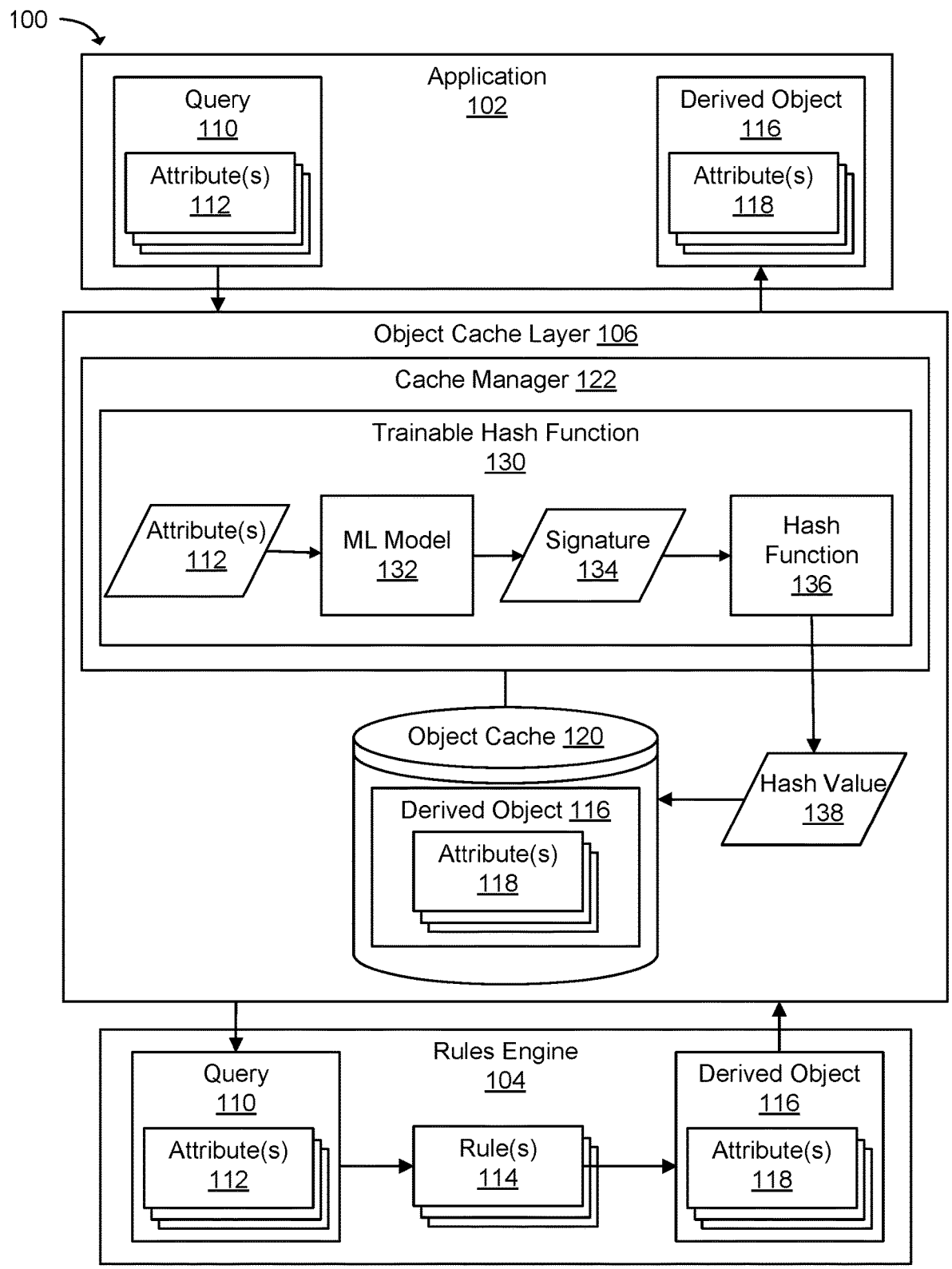
FIG. 1 illustrates an object cache system and related operations using trainable hash functions for predicting incoming event schemas and signatures according to one example of the present technology.

A technology is described for a caching layer for a rules engine. The rules engine may be configured to receive a query and apply a set of rules to deterministically derive and return a query result. The query may include events, objects, and other data to be processed by the rules engine using the set of rules. The query result may include events, objects, and other data resulting from the processing of the query by the rules engine using the set of rules. One benefit of such a design is the ability to add, change, and remove rules without code changes. The design may be useful, for example, because business people (who may not be software engineers) can configure desired behavior for a business without needing to fully understand he source code.

In cases where the rules engine receives the same query and repeatedly derives the same query result over and over again, the caching layer may manage access to a cache storing recent or frequently derived query results to reduce processing time, load, network requests, and the like, on the rules engine. However, efficiency of the cache may be significantly reduced when the rule engine derives the same result from multiple different queries and naïve approaches to cache management are utilized. Machine learning may increase efficiency of the cache when the rules engine derives the same result from processing multiple different queries by reducing the difficulty in mapping the different queries in the cache to a stored result.

In one example, the query may include a source object or query having a set of name-value pairs, key-value pairs, field-value pairs, etc., hereinafter referred to as attributes. The set of names, keys, or fields of the attributes of the source object may be referred to as a "schema of the source object." The rules engine may receive the query and apply the set of rules to the source object to derive a query result. The query result may include another object, referred to as a derived object. The derived object may also include a set of attributes, which may include all or part of the attributes of the source object in addition to one or more additional attributes. The set of names, keys, or fields of the attributes of the derived object may be referred to as a "schema of the derived object." The set of attributes (e.g., key-value pairs or names and values) used by the rules processing engine to deterministically obtain the derived object may be referred to as a signature (or derived object signature). A signature for a derived object may be inferred or predicted from the incoming query.

According to the present technology, the caching layer may use machine learning to manage access to the cache using a schema of the query or source object and a signature created using the schema. For example, the query may include one of many varying source objects with variable number of attributes, types, and values of attributes. The source objects with variable attributes may result in the same derived object being obtained by the rules engine because multiple source objects share the same "incoming event schema" and the same signature generated from the incoming event schema. In various examples, multiple source objects may share a common set of attribute keys and values that cause the rules processing engine to obtain the same derived object. The common or minimum set of attribute keys for multiple source objects may be referred to as the incoming event schema. The common or minimum set of attributes (e.g., key-value pairs or names and values) that result in the same derived object may be referred to as the signature for the derived object. The rules engine may apply the set of rules to multiple source objects, and due to the intersection of the attributes between the source objects having the same incoming event schema and the same signature, the rules engine may obtain the same derived object for the source objects. The caching layer may make intelligent inferences or predictions as to whether the query includes one of a set of source objects that shares the same minimum number of attribute keys and values (e.g., the same signature) that would be used by the set of rules to obtain the same derived object and use the inferences or predictions to access to the cache.

According to one example of the present technology, the caching layer may use machine learning to determine whether the query (e.g., a source object) includes an incoming event schema and signature shared with multiple different queries (or different source objects). The multiple different queries may have already been seen by the caching layer and thus results of the rules engine may be stored in a cache. The caching layer may use machine learning to determine a signature of a derived object potentially stored in the cache. The caching layer may use the signature for the derived object to identify and access the derived object, if the derived object is present in the cache. For example, the caching layer may include a cache manager that manages access to an object cache using a trainable hash function. The cache manager may use the trainable hash function to predict or infer an incoming event schema from the attribute of the incoming query. The incoming event schema may be used to determine which attribute keys are used to form a signature for a derived object potentially stored in the cache. The cache manager may use the trainable hash function to filter attributes of the query according to the incoming event schema to generate the signature. The cache manager may use the trainable hash function to generate one or more hash values for the query using the signature. The cache manager may use the one or more hash values to determine whether the derived object is present in the cache.

According to one example of the present technology, the trainable hash function may include a machine learning model to determine an incoming event schema from a query and the trainable hash function may generate a signature for a derived object using the incoming event schema. The trainable hash function may use the incoming event schema to identify or filter out attributes of the query that may not be part of the signature and, in turn, may not be used by the rules engine to obtain the derived object. The trainable hash function may provide a cache manager with one or more hash values generated from the signature to enable access to the derived object in the cache.

According to another example of the present technology, the rules engine may be used for configuration management. Rule derivation (e.g., rule identification) by the rules engine may be characterized in terms of performance, scalability, hardware requirements, cost per request, standby costs, etc. Rule derivation mechanisms of the rules engine may be complex due to processing using predefined derivation tree structures. The rules engine may receive a query, such as an incoming object or event generated by another application, and process the object or event according to a set of rules. The rules engine may use one or more attributes of the object or event to identify and process the set of rules. Because of rule set growth, the rules engine may have significant computation, RAM, and storage requirements.

According to the present technology, an object cache layer may be used to decrease processing time, network requests, and a load on the rules engine by caching objects recently or frequently derived by the rules engine using the set of rules. The object cache layer may incorporate machine learning to enable caching to apply to individual objects derived by the rules engine from multiple different incoming objects with variable attributes. The object cache layer may provide object caching at a client application to reduce redundant requests to the rules engine and to reduce derivation operations by the rules engine (e.g., finding and executing rules). As a result, the object cache layer may significantly reduce load and increase client rule derivation performance by caching data frequently accessed by the client closer to the client application. Additionally, the object cache layer may provide object caching to multiple client applications as a service to reduce redundant requests to and derivations by the rules engine.

According to one example of the technology, the object cache layer may receive training data indicating one or more incoming events and/or their schemas and/or signatures that may be present in the variable attributes of incoming queries or source objects that the rules processing engine uses with the set of rules to deterministically obtain particular derived objects uniquely identified by the signature. The object cache layer may train the trainable hash function using the training data. The object cache layer may use the trainable hash function to identify one or more attribute keys in a set of attributes of an incoming query as an incoming event schema based in part on the training data. The object cache layer may use the trainable hash function to determine a signature for a derived object using the one or more attributes of the incoming query and the incoming event schema. The trainable hash function may filter the set of attributes of the incoming query to obtain the signature of the derived object for the query.

According to another example of the present technology, the object cache layer may use the trainable hash function to generate a set of one or more hash values by hashing the query using the signature obtained from the query and predicted for the derived object. The trainable hash function may select only those attributes in the set of attributes of the query that are keys in the incoming event schema to use when hashing the query. The object cache layer may use the cache manager to determine whether to access the derived object in the cache using the set of hash values obtained from the trainable hash function. For example, the object cache layer may use the cache manager to determine the presence of the derived object in the cache using the set of hash values. In another example, the object cache layer may use the cache manager to retrieve the derived object from the cache using the set of hash values.

In one example, the cache manager may determine not to access the derived object in the cache, such as, when the set of hash values fail to indicate the presence of the derived object in the cache. As a result of failing to identify a derived object using an incoming event schema and signature predicted from the query, the cache manager may send the query to the rules processing engine to request the derived object. The cache manager may receive the derived object from the rule processing engine and, for example, send the derived object to a requestor that initiated the query. The cache manager may also place the derived object in the cache. The cache manager may also receive a training signature for the derived object from the rules engine. The training signature may include the ground truth as to the set of attributes, if present in any query, the rules engine uses to deterministically obtain the derived object. The cache manager may cause an update to the trainable hash function (e.g., to one or more machine learning models used therein) using the training data signature for the query.

According to the present technology, the trainable hash function of an object cache layer may be tuned to balance a desired accuracy in predicting incoming event schema and signatures of derived objects from incoming queries with the resources used by one or more machine learning models and one or more hashing functions used therein to achieve the desired accuracy. In one example, the object cache layer may determine availability of computing resources for a desired accuracy to determine attribute signatures using the machine learning models. In another example, the object cache layer may also select a level of accuracy to determine incoming event schema and signatures based in part on the availability of the computing resources to the machine learning models. In yet another example, the object cache layer may adapt to traffic at runtime. Specifically, by using training signatures and incoming queries to automatically tune the trainable hash function, the object cache layer may adapt to the traffic and improve by providing greater accuracy in the predictions of incoming event schemas and signatures to the most frequent or repeated requests. In other words, the trainable hash function may be tuned more frequently and more accurately in response to seeing more frequent or repeated events.

Object Cache System

FIG. 1 illustrates an object cache system 100 and related operations using trainable hashing for predicting incoming event schema and signatures according to one example of the present technology. The object cache system 100 may include an application 102, a rules engine 104, and an object cache layer 106. The application 102 may include application logic that queries the rules engine 104 using a query 110. The query 110 may include data, an object, an event, and the like. The query 110 may include one or more attribute(s) 112. The attribute(s) 112 may include a set of name-value pairs, key-value pairs, field-value pairs, attribute-value pairs, and the like.

The rules engine 104 may process the query 110 using one or more conditions or logical expressions in the form of rule(s) 114. The rules engine 104 may form part of a configuration engine, a configuration management system, a business rule management system (BRMS), and the like. The rules engine 104 may apply the rule(s) 114 on the query 110 using series of operations to identify the corresponding or matching rule(s) 114 and then verify or execute the rule(s) 114, for example, by apply triggering actions using the attribute(s) 112. The rules engine 104 may process the query 110 to obtain a derived object 116. In one example, the rules engine 104 may process the attribute(s) 112 of the query 110 to determine additional attributes and combine the additional attributes with the attribute(s) 112 to obtain one or more attribute(s) 118 of the derived object 116. The rules engine 104 may return the derived object 116 to the application 102 in response to the query 110. The query 110 and the derived object 116 may be serialized in the form of a JavaScript Object Notation (JSON) document, an extensible markup language (XML) document, and the like.

The object cache system 100 may employ one or more processor-based computer systems to implement the object cache layer 106 that provides object caching using trainable hash functions for predicting or inferring incoming event schemas and signatures. The object cache layer 106 may be included in one or more client applications (e.g., the client application 102) to provide object caching to the individual client applications. In another example, the object cache object cache layer 110 may be provided as a caching service to one or more other services to provide object caching to one or more client applications. In this example, the object cache layer 106 may include an object cache 120 and a cache manager 122 having a trainable hash function 130.

The cache manager 122 may include hardware and/or software elements that execute various aspects and operations of the object cache layer 106. According to one example of the present technology, the cache manager 122 may perform cache management. The cache manager 122 may read one or more derived objects, such as the derived object 116, from the object cache 120. In addition, the cache manager 122 may store the derived object 116 to the object cache 120. For example, the cache manager 112 may store the derived object 116 subsequent to receipt of the derived object 116 from a rule engine, data store, data processing, database, or similar event generation service. The cache manager 122 may further perform one or more cache maintenance operations with respect to the object cache 120. For example, the cache manager 122 may clean the object cache 120 by removing all or part of the derived objects from the cache. The cache manager 122 may update the derived object 116 or the status of the derived object 116 in the object cache 120. The cache manager 122 may invalidate the derived object 116 or change the status of the derived object 116 in the object cache 120 as expired.

According to another example of the present technology, the cache manager 122 may perform query management. For example, the cache manager 122 may manage ingestion of one or more queries directed to the object cache layer 106. The cache manager 122 may receive a query when the object cache layer 106 receives (e.g., intercepts) an application programing interface (API) call to one or more applications. The cache manager 122 may receive a query when the application 102 incorporates the object cache layer 106 in a process flow prior to sending the query to an external application, such as the rules engine 104. In another example, the cache manager 122 may manage sending the one or more queries to additional layers or external applications, such as the rules engine 104. The cache manager 122 may send a query to a subsequent layer or to an external application (e.g., the rules engine 104) on a cache miss.

The following provides one or more examples of the query 110 with the attribute(s) 112:

Event_1:
    attribute_a: a_1
    attribute_b: b_2
    attribute_z: z_1
Event_2:
    attribute_a: a_1
    attribute_b: b_2
    attribute_z: z_2

The cache manager 122 may use the trainable hash function 130 to process the one or more queries. In one example, the object cache layer 106 may be used with the rules engine 104. The rules engine 104 may provide the derived object 116 with the attribute(s) 118 by processing the rule(s) 114 using the query 110 with the attribute(s) 112. The following are examples of one or more rules that may be used by the rules engine to provide the derived object 116:

```
if {
    attribute_a: a_1
```

```
      attribute_b: b_2
   } then derive object O_1
   if {
      attribute_b: b_1
      attribute_z: z_1
   } then derive object O_2
```

The rules engine 104 may derive object O_1 in response to a query that includes Event_1. In this example, the two attributes (having keys attribute_a and attribute_b) may be viewed as describing the object O_1, and thus forming an incoming event schema (i.e., the minimum set of keys) for derivation of object O_1 and a signature (i.e., minimum set of key-value pairs) representing the object O_1. Any query having the two attributes (key attribute_a with value a_1 and key attribute_b with value b_2) may result in the derivation of the object O_1 by the rules engine 104. Therefore, the rules engine 104 may derive object O_1 in response to a query that includes Event_2 even though Event_1 and Event_2 are different events. Event_1 and Event_2 share the same incoming event schema (e.g., set {attribute_a, attribute_b}) and may be used to infer the same signature (e.g., set {attribute_a: a_1, attribute_b: b_2 representing the object O_1.

As derivation of objects by the rules engine 104 may be costly or slow, when the object cache layer 106 receives multiple similar queries requesting that the rules engine 104 derive the same object over and over again, the cache manager 122 may implement a cost reduction strategy to store recently or frequently derived objects in the object cache 120 as the derived object 116. The cache manager 122 may implement a variety of caching strategies with the object cache 120, such as a Least Recently Used (LRU) cache strategy where the least recently used derived objects are evicted first. The cache manager 122 may also use a method to identify that an input object is the same as a previous one and thus the same derived object should be the result for the input object.

In one example, the cache manager 122 may use a hash function that can calculate a unique hash value for signatures for every query. A hash function in this discussion may refer to a function that receives a signature obtained from an incoming query (e.g., a source object) as input and a hash value as output. The hash value may include a compact representation of the incoming query for the purpose of matching multiple hash values. The cache manager 122 may, for each new query, match the calculated hash value with hash values maintained by the cache manager 122 for the derived object 116 stored in the object cache 120 in order to determine whether to return a derived object 116.

In the above example of Event_1 and Event_2, the cache manager 122 may not be efficient by using all of the attribute keys and determining a signature representing O_1 from Event_1 and Event_2. More specifically, signatures obtained using all of the attributes for Event_1 and Event_2 are different because the events are different, resulting in the hash value(s) for the two events also being different. Because Event_1 includes attribute attribute_z: z_1 and Event_2 includes attribute attribute_z: z_2, the cache manager 122 may not match a signature obtained for Event_1 and Event_2 even though both map to O_1, and O_1 may be stored in the object cache 120 as one of the derived objects 116. Furthermore, there can be many events "Event_x" that derive O_1 and each may have variable attributes. Events such as "Event_x" may have a different number of attributes from which different signatures and hash values may be obtained which can make a naive cache solution inefficient.

According to the present technology, the cache manager 122 may use the trainable hash function 130 when queries have variable attributes but map to the same derived objects, such as when a limited part or subset of the attributes of input objects may be identified as signatures of derived objects. For example, suppose an incoming event schema for Event_M and Event_N may be represented as "attribute_a, attribute_b." The cache manager 122 may not know the incoming event schema for Event_M and Event_N before receiving queries to have the rules engine 104 processes the events. In the naive case, when the incoming event schema is actually known upfront, the cache manager 122 may apply a naive hash algorithm to a corresponding part of an event filtered using the known incoming event schema. In another example, the cache manager 122 may not know whether Event_M and Event_N share the same incoming event schema. In this case, the cache manager may use the trainable hash function 130 to predict the incoming event schema upon receiving either Event_M or Event_N, filter the corresponding part of the event (e.g., query) to obtain a signature, and calculate a hash of the event using the signature.

In one configuration, the cache manager 122 may use the trainable hash function 130 to employ machine learning to construct the incoming event schema and signatures when events have variable attributes. A trainable hash function may include a hash function with a component which is trainable (in machine learning sense). The trainable hash function may attempt to infer or predict an output that results in the same hash value for the events with different attributes but from which the rules engine 104 derives the same derived object. In one example, a trainable hash function may consist of a form of machine learning that implements incoming event schema approximation, filters of the incoming query using the incoming event schema, and applies one or more hash functions to the filtered incoming query. In the naive case of the hash function, a string concatenation of the filtered incoming query may be generated.

The trainable hash function 130 may include hardware and/or software elements that compute an incoming event schema and signature in the case when the schema is not known upfront before actual derivation. The trainable hash function 130 may utilize one or more machine learning models, such as a machine learning (ML) model 132, to construct the expected incoming event schema of the derived object 116 in the object cache 120 from the attribute(s) 112 of the query 110. For example, a neural network or another machine learning model may be used, as discussed later. The trainable hash function 130 may be trained online during runtime, during initialization, or before initialization. Some other training combinations are also possible, for example, prior to initialization with online tuning in runtime. The trainable hash function 130 may use one or more machine learning algorithms to generate predictions. The trainable hash function 130 may learn how to calculate incoming event schema and signatures, such as signature 134, for derived objects by extracting relationships between incoming queries and incoming event schemas and signatures from the training data. The trainable hash function 130 may make inferences or predictions for the query 110 to enable the construction of the expected incoming event schema and the signature 134 from the attribute(s) 112 and generate a hash value 138, which in turn will enable the cache manager 122 to determine whether to access the derived object 116 in the object cache 120.

For example, the trainable hash function 130 may determine the signature 134 for the derived object 116 using the attribute(s) 112 of the query 110. The signature 134 may include a set of attributes (e.g., filtered) from the attribute(s) 112 identified using machine learning by the ML model 132. The trainable hash function 130 may identify which of the attribute(s) 112 of the query 110 are the expected incoming event schema and construct the signature 134 for the derived object 116.

The trainable hash function 130 may use one or more hash functions (e.g., a hash function 136) to calculate one or more hash values, such as the hash value 138, using the signature 134 for the derived object 116. The trainable hash function 130 may filter out or identify one or more of the attribute(s) 112 using the expected incoming event schema to obtain the signature 134. The trainable hash function 130 may then calculate the hash value 138 from the query 110 using just the attributes identified by the signature 134. According to an example of the present technology, the cache manager 122 may use the trainable hash function 130 to retrieve the derived object 116 from the object cache 120 using the hash value 138.

The cache manager 122 may return the derived object 116 retrieved from the object cache 120 to a requestor (e.g., a client or requesting service), such as the application 102. The cache manager 122 may use the trainable hash function 130 to determine whether to access the object cache 120. If the trainable hash function 130 derives the incoming event schema and signature correctly and the derived object 116 is present in the object cache 120, the cache manager 122 may return the derived object 116 to the requestor from the object cache 120. If the trainable hash function 130 fails to correctly derive the incoming event schema and signature, the trainable hash function 130 may learn how to calculate the incoming event schema and signature for further queries of this kind using a training signal. The trainable hash function 130 may receive the training signature to provide assistance or an adjustment, for example, when new derived objects are added to the object cache 120. On a cache miss, the cache manager 122 may request the derived object 116 from an additional layer or external application (e.g., the rules engine 104, data store, data computation engine, etc.). The cache manager 122 may receive a training signature that may be used to confirm whether the incoming event schema and signature was derived correctly and to tune the machine learning.

According to the present technology, the object cache layer 106 may provide a generic cache solution within multiple levels in a hierarchy of cached rules engines. The object cache layer 106 may return the signature 134 together with the derived object 116 to the application 102 implementing another cached rules engine. In one configuration, the application 102 may be a service for another client. The application 102 may perform application logic itself and also work with rules engine 104 for decision making. As a result, the application 102 may return a high-level derived object together with a corresponding signature to one or more clients. One benefit of hierarchical caching is in the ability to construct recurrent services where some of the services may use the object caching layer 106. For example, a sequence (acyclic graph) of cached rules engines (rules services) may be formed. Each of the rules services may perform the following operations: receive incoming requests, send requests to other rules engines or services, execute deterministic logic using incoming object and responses from the requests sent down, and use an object cache layer with a trainable hash function. Each of rules services may also perform the following operations: accumulate the signatures received as responses from other rules engines or services, add the attributes that were used by the service itself, and return derived objects together with the accumulated signatures in response to the incoming requests. The rules services may tune the trainable hash functions with the signatures received as responses from other rules engines or services.

Figure 2:
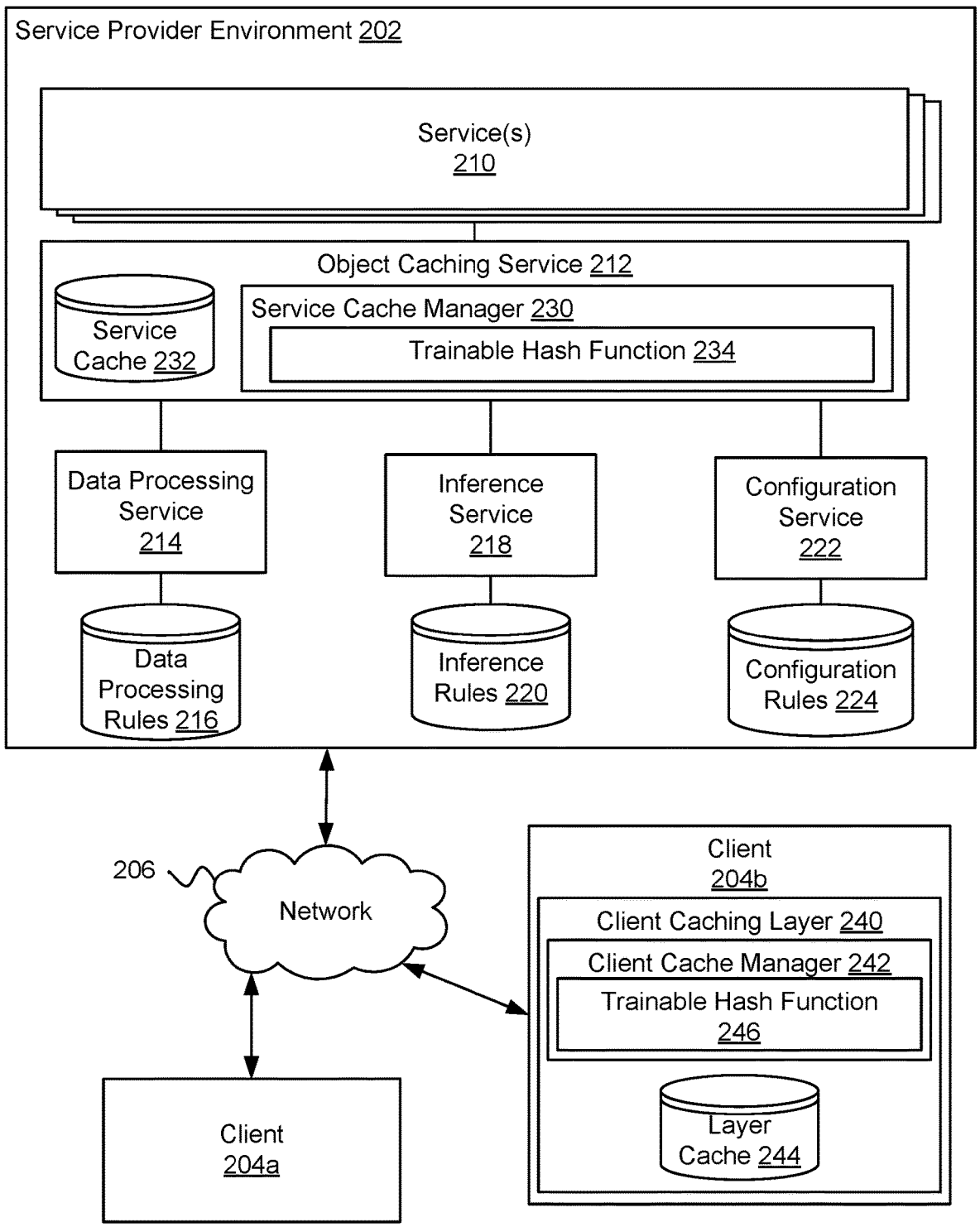
FIG. 2 illustrates an object cache system and related operations using a trainable hash function according to one example of the present technology.

FIG. 2 illustrates an object cache system 200 and related operations using a trainable hash function according to one example of the present technology. The object cache system 200 may include a service provider environment 202 in communication with one or more clients (e.g., a client 204a and a client 204b) using a network 206. The service provider environment 202 may employ virtualization that allows a single physical server computer to host multiple computing instances (e.g., virtual guest machines) using a hypervisor or another virtualization scheme. Each computing instance may be a guest machine acting as a distinct logical computing system.

The service provider environment 202 may include one or more service(s) 210, an object caching service 212, a data processing service 214 having a set of data processing rules 216, an inference service 218 having a set of inference rules 220, and a configuration service having a set of configuration rules 224. The one or more service(s) 210 may include one or more processes executing on a server or other computer hardware. The service(s) 210 may be centrally hosted functionality or a service application that may receive requests and provide output to other services or devices. For example, the service(s) 210 may be considered on-demand computing that are hosted in a server, virtualized service environment, grid or cluster computing system. An API may be provided for the service(s) 210 to enable other services or devices to send requests to and receive output from the service(s) 210. Some examples of the service(s) 210 that may be provided by the service provider environment 202 may include compute services, data store services, networking services, web services, streaming services, network accessible services, software as a service, storage as a service, on-demand applications, services for the execution of code functions, and services associated with rules system computational models.

For example, the data processing service 214 may include compute services and data store services for processing data using the set of data processing rules 216. The data processing service 214 may include the set of data processing rules 216, allowing decision logic to be externalized from core application code. The data processing service 214 may provide tools allowing both developers and business experts to define and manage decision logic in the form of the set of data processing rules 216. The data processing service 214 may provide a runtime environment allowing applications to invoke decision logic managed within the data processing service 214 using the set of data processing rules 216.

The data processing service 214 may receive a query, for example, from one or more of the service(s) 210 or the clients 204a, 204b. The data processing service 214 may process the query using the set of data processing rules 216 to provide a result. The query may include one or more events, objects, and the like that have a set of attributes and values for the attributes. The data processing service 214 may apply the set of data processing rules 216 on the query using a series of operations to identify the matching rules and then to execute the rules' actions. The data processing service 214 may return a result (e.g., an event or reply object) of processing the query using the set of data processing rules 216 to a requestor.

In another example, the inference service 218 may include compute services and data store services for applying the set of inference rules 220 to a knowledge base to deduce new information. The inference service 218 may include the set of inference rules 220, allowing inference logic to be externalized from various applications. The inference service 218 may include a collection of network-accessible services executed on computer hardware that provide multiple channels (e.g., mobile app., voice-based search, web access, physical presence, etc.) through which customers (using client computing devices) can access various knowledge bases stored in databases. The inference service 218 may provide tools allowing both developers and business experts to define and manage inference logic in the form of the inference rules 220. The inference service 218 may provide a runtime environment allowing applications to invoke inference logic managed within the inference service 218 using the set of inference rules 220.

The inference service 218 may receive an inference query, for example, from one or more of the service(s) 210 or the clients 204a, 204b. The query may include a request related to one or more products or services. The inference service 218 may process the query using the set of inference rules 220 to provide a result in real time about the product or services, such as product recommendations with respect to customer criteria, service suitability to a task, and the like. The inference service 218 may run the set of inference rules 220 on the query through a series of operations to identify the rules whose conditions match and then execute the rules' actions. The inference service 218 may return a result of processing the query using the set of inference rules 220 to a requestor.

In yet another example, the configuration service 222 may include compute services and data store services for processing configuration requests using the set of configuration rules 224. The configuration service 222 may include the set of configuration rules 224, allowing product configuration logic to be externalized from various product configuration. The configuration service 222 may include a collection of network-accessible services executed on computer hardware that provide multiple channels (e.g., mobile app., voice-based search, web access, physical presence, etc.) through which customers (using client computing devices) can access various catalogs stored in databases to find various products and services available to purchase, lease, etc. sometimes in the form of detail pages. The configuration service 222 may provide tools allowing both developers and business experts to define and manage configuration logic in the form of the configuration rules 224. The configuration service 222 may provide a runtime environment allowing configuration and e-commerce applications to invoke configuration logic managed within the configuration service 222 using the set of configuration rules 224.

The configuration service 222 may receive a configuration query, for example, from one or more of the service(s) 210 or the clients 204a, 204b. The configuration query may include a proposed configuration of a product or service. The configuration service 222 may process the query using the set of configuration rules 224 to provide a result that maintains or enforces consistency of the product or service's performance, functional attributes, and/or physical attributes with established operational constraints and design. The configuration service 222 may run the set of configuration rules 224 for the query through a series of operations to identify the rules whose conditions match and then execute the rules' actions to validate the proposed configuration. The configuration service 222 may return a result of processing the query using the set of configuration rules 224 to a requestor.

According to the present technology, one or more object cache layers may store recently or frequently derived objects provided by the data processing service 214, the inference service 218, and/or the configuration service 222. Other processing and cost reduction strategies may be used, such as, caching objects that are more expensive to derive (in a processing, load, computation, etc. sense) or caching certain objects when a rule engine uses mixed storage: expensive, slow, regular etc. The object caching service 212 of the service provider environment 202 may take advantage of machine learning for incoming queries that have variable attributes, as received from clients of the data processing service 214, the inference service 218, and the configuration service 222. In another example, a client caching layer 240 of the client 204b may take advantage of machine learning for queries that have variable attributes for a local client application using one or more of the data processing service 214, the inference service 218, and the configuration service 222. Some of the service(s) 210 and clients 204 may use or may not use the object caching service 212 or client caching layer 240. For example, a trainable hashing layer may be used as an optimization step, so some of the service(s) 210 and clients 204 may decide not to use the trainable hash layer, for example, because of hardware limitations.

In this example, the object caching service 212 may include a service cache manager 230, a service cache 232, and a trainable hash function 234. The service cache manager 230 may use the trainable hash function 234 to approximate the incoming event schema and resulting signatures of derived objects in the service cache 232 from the incoming objects from the service(s) 210 and the clients 204a, 204b. The service cache manager 230 may use the trainable hash function 234 to determine a hash value using the signature of a derived object. The service cache manager 230 may use the hash value to determine whether to access the derived object in the service cache 232.

Accordingly, the object caching service 212 may be widely adapted by the service(s) 210 and the clients 204a, 204b at minimal cost in reconfiguring application code. The service(s) 210 and the clients 204a, 204b may benefit from a shared cache provided by the object caching service 212. Additionally, even if the service(s) 210 and the clients 204a, 204b having existing cache solutions, the shared cache provided by the object caching service 212 automatically adapts in the case of attribute variation across incoming queries to provide additional benefits of increased responsiveness and reducing processing by the data processing service 214, the inference service 218, and the configuration service 222. Results of using the present technology may also include decreased latency, significantly decreased network utilization, decreased usage, decreased operational noise, enhanced management with activity spikes, removing redundant calls which increase scalability, and the like A cache layer also adds robustness due to the ability to process a high number of cached requests-results with minimal additional resources.

In one example configuration, the client 204b may include a client caching layer 240, which includes a client cache manager 242, a layer cache 244, and a trainable hash function 246. The client cache manager 242 may use the trainable hash function 246 to approximate the schema of derived objects in the layer cache 244 from one or more applications of the client 204b using the client caching layer

240. The client cache manager 242 may use the trainable hash function 246 to determine an attribute signature of a derived object. The client cache manager 242 may use the trainable hash function 246 to determine whether to access the derived object in the layer cache 244 using a set of hash functions and the attribute signature of the derived object.

Accordingly, the client caching layer 240 may be widely adapted for various applications executed by the client 204*b*. The applications on the client 204*b* may benefit from a dedicated cache provided by the client caching layer 240. The dedicated cache provided by the client caching layer 240 may automatically adapt in case of attribute variation across incoming queries from local clients using one or more of the data processing service 214, the inference service 218, and the configuration service 222. The client caching layer 240 provides the additional benefits of increased responsiveness and reducing processing by the data processing service 214, the inference service 218, and the configuration service 222 by partitioning data most used by the applications.

According to another example of the present technology, changes may occur to the rules associated with the data processing service 214, the inference service 218, and the configuration service 222. These changes may occur in time much slower than the time to update or adapt a trainable hash function and thus the services may benefit from a cache layer. In the case of a dynamic rule engine, a notification mechanism may be introduced so that the cache layer may invalidate cached objects that would no longer be derived by the rules engine due to a change. In another example, a maximum time to stay in the cache may be implemented after which a cache manager may send a request to the rule engines to validate the current states of a derived object.

In yet another example, each signature returned from the rule engine may include a rules engine version. If a newer or increased version is received then an entire cache layer may be reset. One or more notifications and change validation schemes may be implemented depending on factors such as the frequency of rule engine updates, cache layer adaptation time, traffic rates, cost to do extra validation requests, and the like.

Figure 3A:
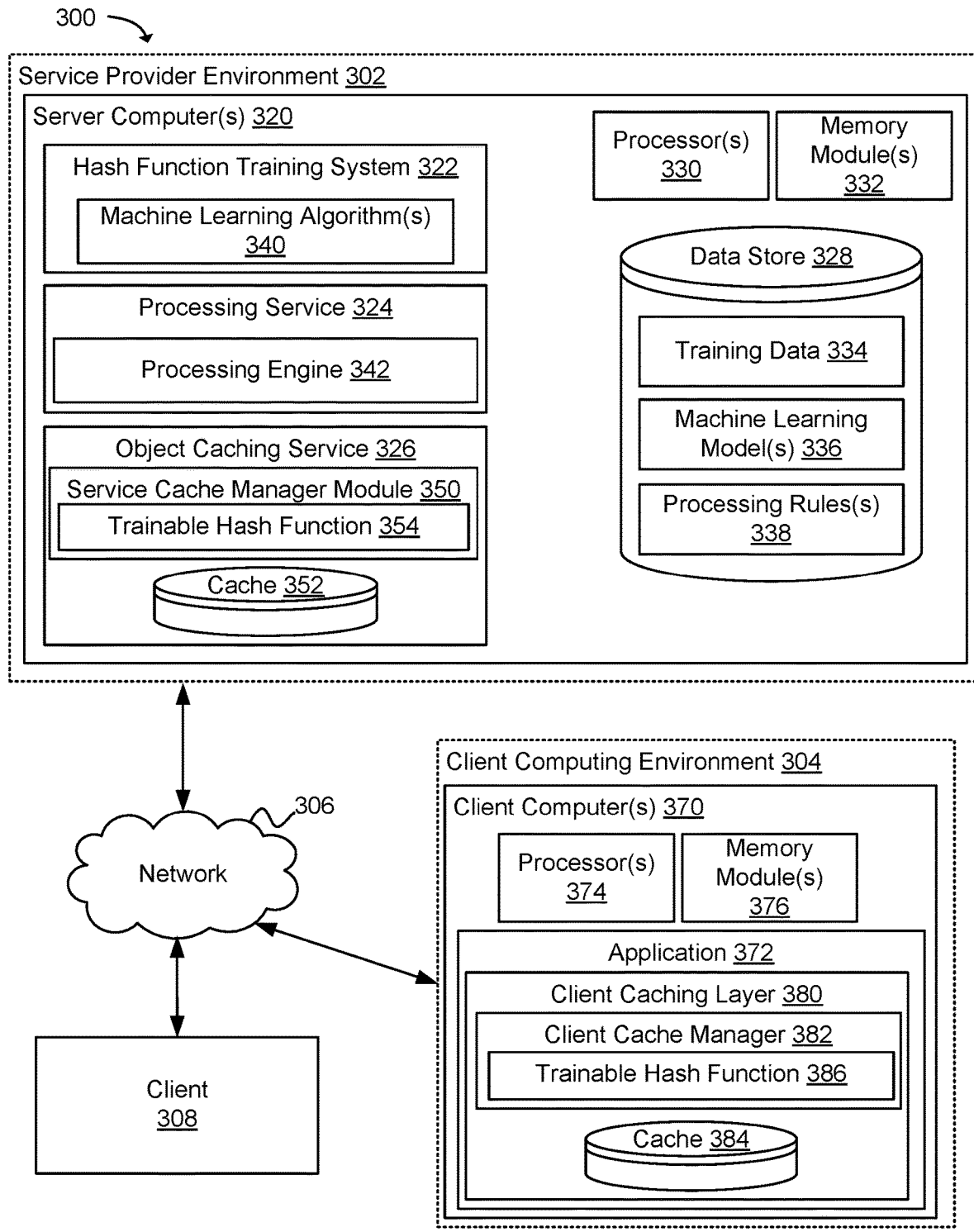
FIGS. 3A and 3B illustrate various example components included in an object cache system using trainable hash functions according to one example of the present technology.
Figure 3B:
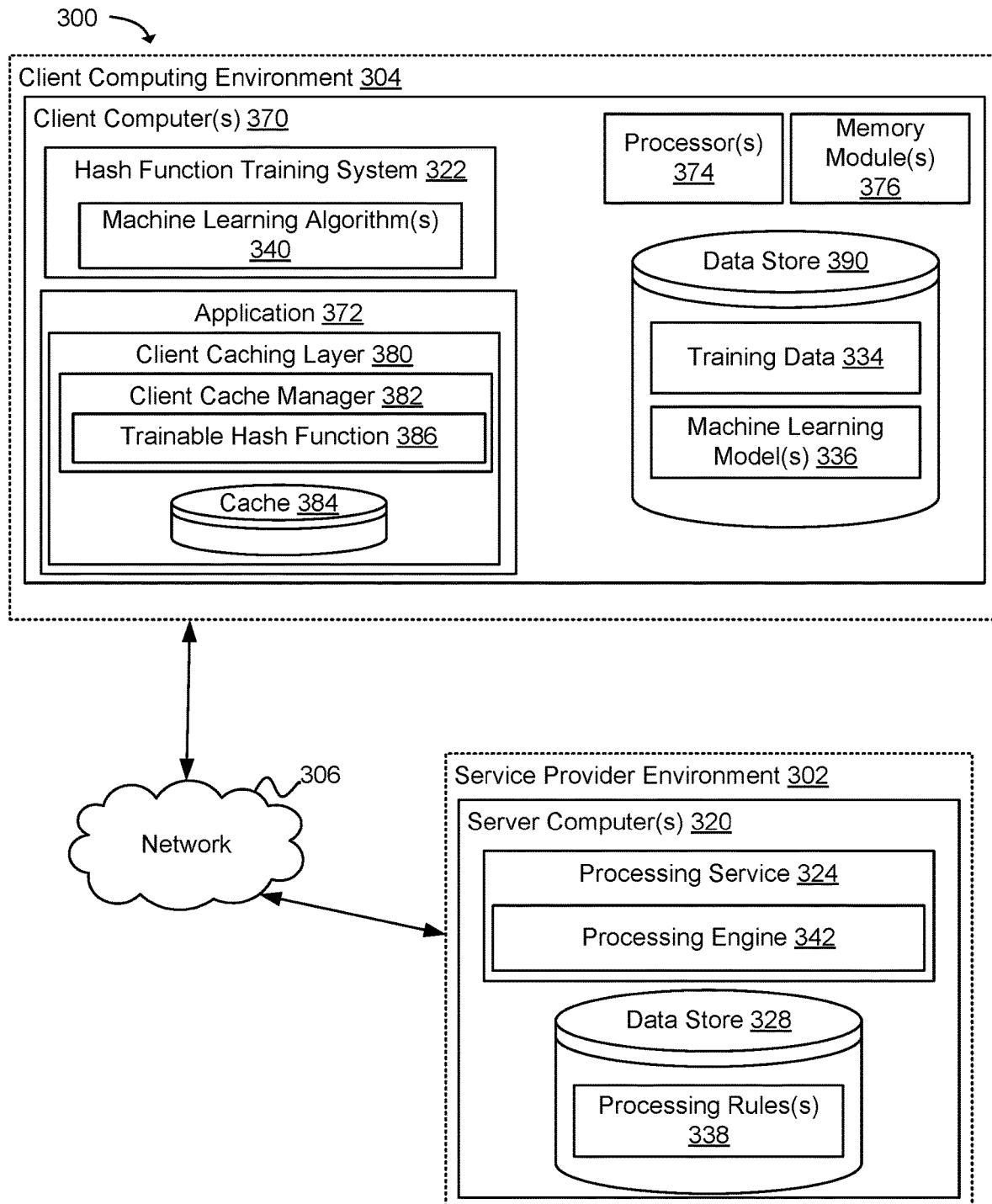

FIGS. 3A and 3B illustrate various example components included in an object cache system 300 using trainable hash functions according to one example of the present technology. The object cache system 300 may include a service provider environment 302 in communication with a client computing environment 304 using a network 306. The service provider environment 302 may include one or more server computer(s) 320. The server computer(s) 320 may include a hash function training system 322, a processing service 324, an object cache service 326, a data store 328, one or more processor(s) 330, and one or more memory module(s) 332.

The data store 328 may include training data 334, one or more machine learning model(s) 336, and one or more processing rule(s) 338. The hash function training system 322 may include one or more machine learning algorithm(s) 340 that use the training data 334 to produce the machine learning model(s) 336. Some examples of the machine learning algorithm(s) 340 may include supervised learning and unsupervised learning, neural networks, autoencoders, linear regression, logistic regression, classification and regression trees, support vector machines, random forest, gradient boosting, and the like. In one example, a neural network may be used to generate the machine learning model(s) 336. The neural network may include MultiLayer Perceptron (MLP) architecture with the last layer containing neurons with sigmoid activation function representing a probability that corresponding attributes (key) should be used in expected schema (and consequently in the signature). In another example, an Autoencoder (AE) neural network may be used to generate the machine learning model(s) 336. The Autoencoder may be used for denoising of incoming queries to attempt to retain attributes that represent (or oppositely filter out event that are not required for) an incoming event schema and signature. Since the Autoencoder may deterministically reconstruct output from one or more hidden layers (e.g., special interest is a middle layer) then a hidden layer representation of an incoming query also may be used as a signature obtained from the incoming query.

The processing service 324 may include a processing engine 342 that uses the processing rule(s) 338 to produce derived objects from input objects. The object cache service 326 may include a cache service manager module 350, a cache 352, and a trainable hash function module 354. The cache service manager module 350 may use the trainable hash function 354 to determine whether to access objects in the cache 352. Specifically, the trainable hash function 354 may incorporate one or more of the machine learning model(s) 336 to make inferences or predictions from incoming objects that have variable attributes to generate the expected incoming event schema and signatures of objects stored in the cache 352. The cache service manager module 350 may use a hash value generated by the trainable hash function 354 using the expected incoming event schema and signatures to determine whether to access objects in the cache 352.

The client computing environment 304 may include one or more client computer(s) 370. The client computer(s) 370 may include an application 372 having a client cache layer 380. The client cache layer 380 may include a client cache manager 382, a cache 384, and a trainable hash function module 386. The cache manager 382 may use the trainable hash function 386 to determine whether to access objects in the cache 384. The trainable hash function 386 may incorporate one or more of the machine learning model(s) 336 to make inferences or predictions from incoming objects that have variable attributes.

As illustrated in FIG. 3A, one or more clients, such as a client 308, may utilize the object cache service 326 to provide caching for objects having variable attributes that are derived by the processing service 324. Alternatively, the application 372 may utilize the client cache layer 380 within the client computing environment 304 to provide caching for objects having variable attributes that are derived by the processing service 324. The hash function training system 322 may initialize the trainable hash functions 354 and 386 prior to runtime. The hash function training system 322 may also provide ongoing feedback and learning for the trainable hash functions 354 and 386 during execution.

As illustrated in FIG. 3B, the client computing environment 304 may include the hash function training system 322. The client computing environment 304 may include a data store 390 that includes the training data 334 and the machine learning model(s) 336. The trainable hash function 386 may be initialized prior to execution and receive ongoing feedback and learning as the application 372 accesses the processing service 324 hosted by the service provider environment 302.

The various processes and/or other functionality contained within the object cache object cache system 300 may be executed on one or more processor(s) 330 and 374 that are in communication with one or more memory module(s)

332 and 376 respectively. The system 300 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files, and data storage configuration in any centralized, distributed, or clustered environment. The storage system components of the data stores 328 and 390 may include storage systems such as a SAN (Storage Area Network), cloud storage network, volatile or non-volatile RAM, optical media, or hard-drive type media. The data stores 328 and 390 may be representative of a plurality of data stores as can be appreciated.

The network 306 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIGS. 3A-3B illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIGS. 3A-3B illustrate an example of systems that may implement the techniques above, many other similar or different environments are possible. The example environments discussed and illustrated above are merely representative and not limiting.

Figure 4A:
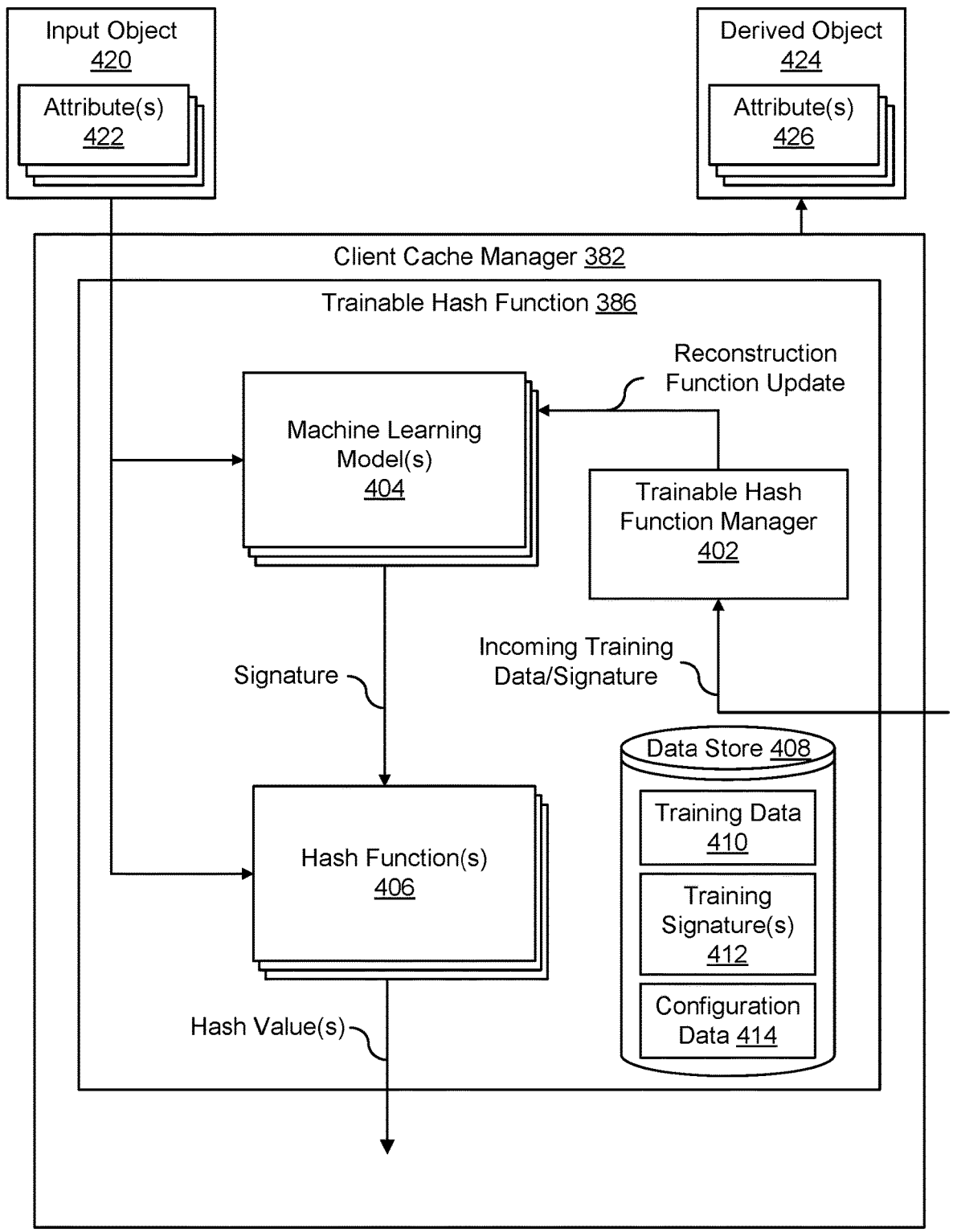
FIGS. 4A and 4B illustrate a client cache manager and related operations using a trainable hash function according to one example of the present technology.
Figure 4B:
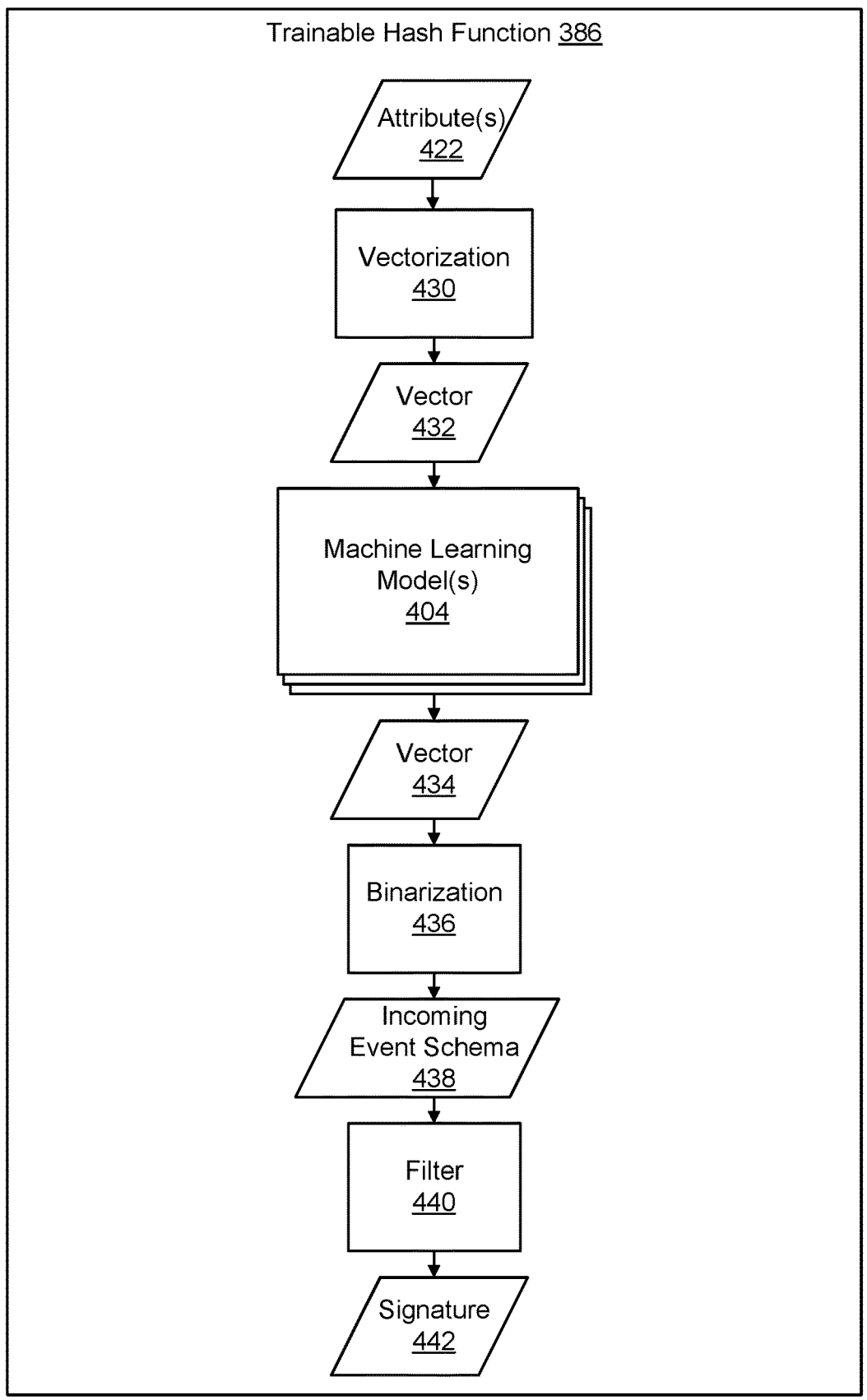

FIGS. 4A and 4B illustrate the client caching layer 380 or client cache manager 382 of FIGS. 3A-3B and related operations using the trainable hash function module 386 according to one example of the present technology. In this example, the trainable hash function module 386 may include a trainable hash function manager 402, one or more machine learning model(s) 404, one or more hash function(s) 406, and a data store 408. The data store 408 may include training data 410, one or more training signature(s) 412, and configuration data 414.

The client cache manager 382 of the client cache layer 380 may receive an input object 420 having one or more attribute(s) 422. The client cache manager 382 may use the trainable hash function module 386 and the input object 420 to determine whether to access a derived object 424 having one or more attribute(s) 426 in the cache 384. For example, the client cache manager 382 may access the cache 384 when the trainable hash function module 386 correctly constructs the expected incoming event schema and signature of the derived object 424 from the input object 420.

In one implementation, to predict the expected incoming event schema and signature of the derived object 424 from the input object 420, the trainable hash function manager 402 may select one or more of the machine learning model(s) 404 to use with the input object 420. The trainable hash function manager 402 may select one of the machine learning model(s) 404 over another to balance accuracy, computing resource availability, and processing time. The trainable hash function manager 402 may select and combine multiple machine learning model(s) 404, for example, to improve accuracy.

The machine learning model(s) 404 may infer or predict the expected incoming event schema and signature of the derived object 424 from the input object 420. The machine learning model(s) 404 may include one or more files including mathematical functions used to describe relationships between input objects and the expected incoming event schema and signature of the derived object 424. In one example, the machine learning model(s) 404 may analyze a set of one or more attributes of the input object 420. The machine learning model(s) 404 may make an inference or prediction using the mathematical functions to determine whether the attributes of the input object 420 correspond to the expected incoming event schema of the derived object 424. The machine learning model(s) 404 may construct a signature for the derived object 424 from the attributes of the input object 420 using the incoming event schema.

As illustrated in FIG. 4B, the trainable hash function module 386 may process the attribute(s) 422 of the input object 420, for example by parsing a JSON document. A vectorization 430 operation may be performed using one or more vectorization techniques, such as one-hot encoding which creates (binary) columns, indicating the presence of each attribute value. The vectorization 430 operation may generate a vector 432 indicating the presence of each possible value for every attribute or some of the attribute(s) 422. Using the vector 432, the machine learning model(s) 404 may generate a vector 434 of the expected incoming event schema representing the probabilities (or other measure) of every attribute to be in the incoming event schema for the derived object 424. In one example, using a neural network, each neuron may be provided with an activation function that outputs real values from 0 to 1 which represents the probability that attribute should be used in the incoming event schema. The machine learning model(s) 404 may send the vector 434 to a binarization operation 436. The binarization operation 436 may apply thresholds to round each 0 to 1 value up or down. The binarization operation 436 may output a binary vector, for example, where all 1's may form a schema, represented as the incoming event schema 438.

The incoming event schema 438 may include a binary vector of flags representing which attribute key in the attribute(s) 422 of the input object 420 is useful for unique object derivation. Using the example of Event_1, a binary vector "[1,1,0]" represents the incoming event schema and that only "attribute_a", "attribute_b" in the set of "attribute_a", "attribute_b", "attribute_z" are useful for unique object derivation of the derived object 424. In filter operation 440, the binary vector of the incoming event schema 438 is used to filter the attribute(s) 422 of input object 420. The filter operation 440 provides a signature 442 for the derived object 424. For example, the filter operation 440 may output "attribute_a: a1, attribute_b: b_2" as the signature 442.

The hash function(s) 406 may be used to calculate one or more hash values using the attribute signature obtained from the machine learning model(s) 404. The hash function(s) 406 may apply one or more hash functions to each attribute of the input object 420 that is included in the signature obtained from the machine learning model(s) 404. The result is a set of hash values. In one example, a hash strategy may use the same one-hot encoding binarization strategy as was used in vectorization. The number of 1's in the signature vector may be less that number of 1's in binarized vector 432 because some of attributes are filtered out by the machine learning model(s) 404. The binary vector or array forms a simple hash value. If a hash value of a specific length is preferred, then the array can be split. An XOR of the left half with the right half may reduce the hash value length by two. Similar other length reduction strategies may be used (e.g., XOR, Modulus, etc.). If length reduction is used, the hash value may be accompanied with the signature for verification purposes to ensure a collision free property of the hash.

Accordingly, the client cache manager 382 may use the trainable hash function module 386 to determine whether to access the derived object 424 in the cache 384. The client cache manager 382 may use the hash values obtained from the trainable hash function module 386 to determine presence of the derived object 424 in the cache 384. If the derived object 424 corresponding to the input object 420 is not present in the cache 384, the client cache manager 382 may request the derived object 424 from the processing service 324 (see FIG. 3A). The client cache manager 382 may also request the derived object 424 from the processing service 324 in the case the cache object is expired. As an example, the client cache manager 382 may send the input object 420 to the processing service 342 for processing by the processing engine 342 and the processing rule(s) 338.

The trainable hash function module 386 can further learn when a cache miss occurs. The trainable hash function manager 402 may provide updates to the prediction functions of the machine learning model(s) 404. The trainable hash function manager 402 may use the training data 410 to identify relationships between input objects and the expected schema of the derived object 424 and revise the machine learning model(s) 404 during execution. The trainable hash function manager 402 may also receive periodic updates to the training data 410 to improve identification of the relationships between input objects and the incoming event schema of the derived object 424.

For example, the trainable hash function manager 402 may use the training signature(s) 412 during execution to update and improve identification of the relationships between input objects and the incoming event schema of the derived object 424. The client cache manager 382 may receive the training signature(s) 412 with or in addition to the derived object 424 from the processing service 324. The trainable hash function manager 402 may use the training signature(s) 412 as a representation of the ground truth schema that was supposed to be derived. The trainable hash function manager 402 may use the training signature(s) 412 to improve the machine learning model(s) 404 to derive the expected schema allowing the hashing function(s) 406 to obtain the corresponding hash. The trainable hash function manager 402 may receive validation that the set of hash values was calculated incorrectly and use that feedback for the input object 420 as feedback for learning to provide better accuracy with any future similar object.

Figure 5:
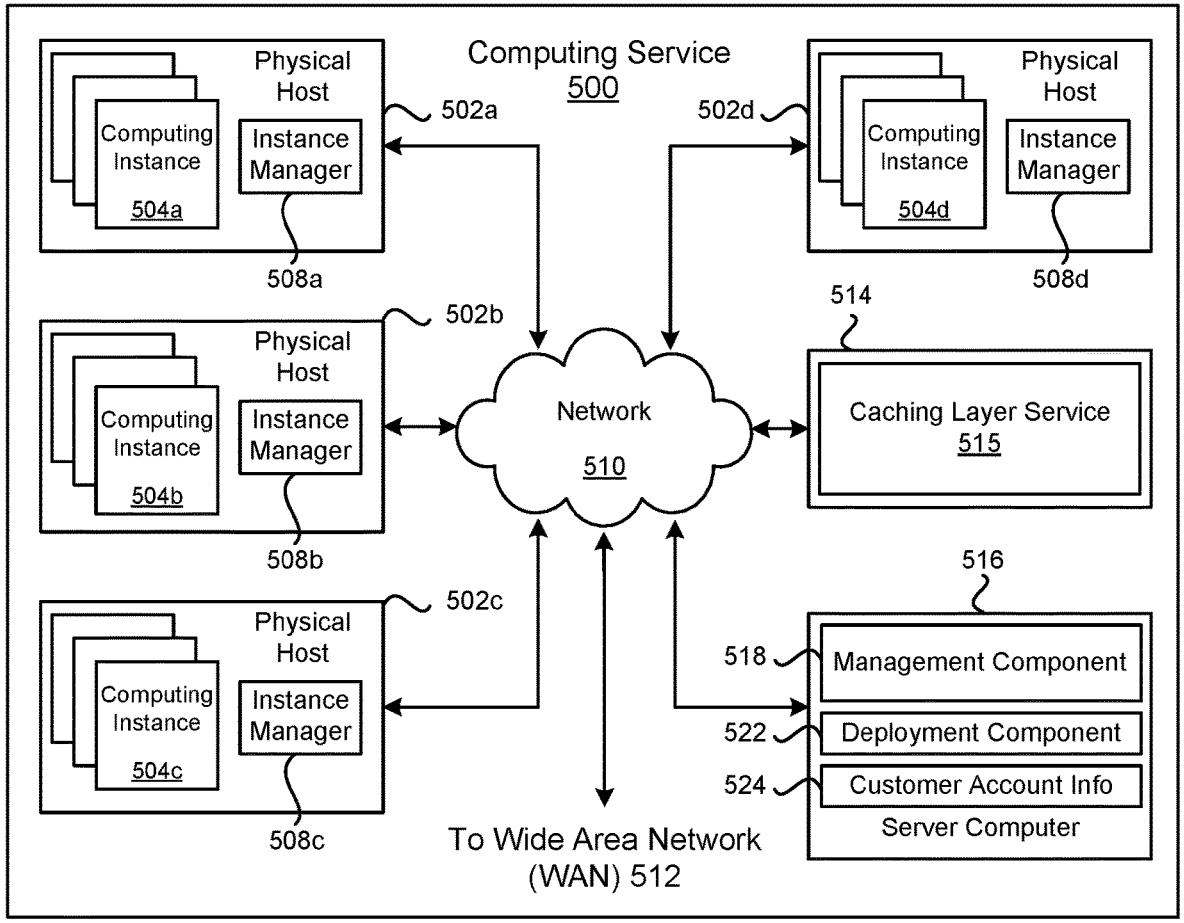
FIG. 5 is a block diagram that illustrates an example computing service that includes a trainable hash function service for object caching with rules engines according to one example of the present technology.

FIG. 5 is a block diagram that illustrates an example computing service that includes a trainable hash function service for object caching with rules engines according to one example of the present technology. The computing service 500 may be used to execute and manage a number of computing instances 504a-d upon which the present technology may execute. In particular, the computing service 500 depicted illustrates one environment in which the technology described herein may be used. The computing service 500 may be one type of environment that includes various virtualized service resources that may be used, for instance, to host computing instances 504a-d.

The computing service 500 may be capable of delivery of computing, storage, and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), Network accessible service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing network-accessible system or service that may include an operating system, programming language execution environment, database, and web server.

Application developers may develop and run their software solutions on the network-accessible system or service without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running web browsers or other lightweight client applications, for example. Those familiar with the art will recognize that the computing service 500 may be described as a "cloud" environment.

The particularly illustrated computing service 500 may include a plurality of server computers 502a-d. The server computers 502a-d may also be known as physical hosts. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine manager (VMM), or another type of program configured to enable the execution of multiple computing instances 504a-d on a single server. Additionally, each of the computing instances 504a-d may be configured to execute one or more applications.

A server computer 514 may be reserved to execute software components for implementing the present technology or managing the operation of the computing service 500 and the computing instances 504a-d. For example, the server computer 514 may execute a caching layer service 515. The caching layer service 515 may enable client applications to incorporate an object cache layer that uses machine learning to calculate schema for objects for which the schema is variable and unknown prior to runtime.

A server computer 516 may execute a management component 518. A customer may access the management component 518 to configure various aspects of the operation of the computing instances 504a-d purchased by a customer. For example, the customer may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a customer that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache is to be prepared, and other types of information. The deployment component 522 may utilize the customer-provided configuration and cache logic to configure, prime, and launch computing instances 504a-d. The configuration, cache logic, and other information may be specified by a customer accessing the management component 518 or by providing this information directly to the deployment component 522.

Customer account information 524 may include any desired information associated with a customer of the multi-tenant environment. For example, the customer account information may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502a-d, 516. The network 510 may be a local area network (LAN) and may be connected to a Wide Area Network (WAN) 512 or the Internet, so that end customers may access the computing service 500. In addition, the network 510 may include a virtual network overlaid on the physical network to provide communications between the server computers 502a-d. The network topology illustrated in FIG. 5 has been simplified, as many more networks and networking devices may be utilized to interconnect the various computing systems disclosed herein.

Figure 6:
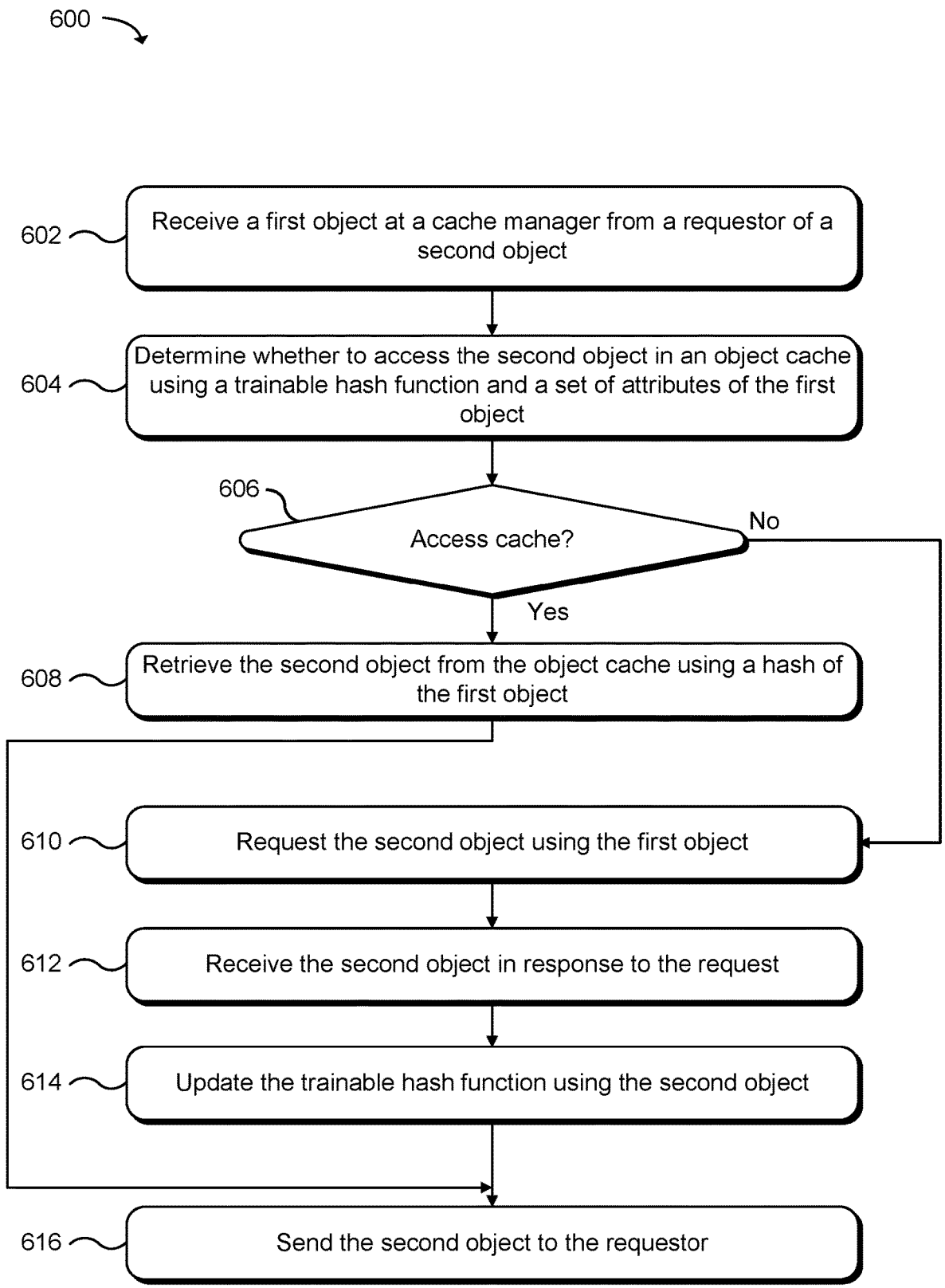
FIG. 6 is a flow diagram that illustrates an example method for managing an object cache of a rules engine using a trainable hash function according to one example of the present technology.

FIG. 6 is a flow diagram that illustrates an example method for managing an object cache for a rules engine using a trainable hash function according to one example of the present technology. The method 600 may be performed by software (e.g., instructions or code modules) when executed by a central processing unit (CPU, GPU, or processor) of a logic machine, such as a computer system or information processing device, by hardware components of an electronic device or application-specific integrated circuits, or by combinations of software and hardware elements.

In operation 602, a cache manager receives a first object from a requestor of a second object. The cache manager may receive the first object from the requestor at an object cache layer of a client application. The cache manager may also be included as part of an object cache service hosted by a service provider environment to receive the first object from the requestor. The cache manager may receive the first object as an implied request for a second object. In another example, the cache manager may receive a specific request for the second object that is accompanied by or references the first object.

In operation 604, the cache manager may determine whether to access the second object in an object cache using a trainable hash function and a set of attributes of the first object. The cache manager may send the first object to the trainable hash function to obtain one or more hash values to determine presence of the second object in the object cache. For example, the cache manager may use the trainable hash function to infer or predict the expected incoming event schema and signature of the second object from the set of attributes of the first object. The cache manager may use the trainable hash function to calculate a set of hash values from the first object using attributes identified in the set of attributes of the first object that correspond to the expected incoming event schema and signature of the second object. The cache manager may use the set of hash values to determine whether the second object is present in the object cache.

If the cache manager determines to access the second object in the object cache using the trainable hash function and the set of attributes of the first object, in operation 608, the cache manager may retrieve the second object from the object cache using a hash of the first object. For example, the cache manager may use a set of hash values to identify the location of the second object in the object cache. The cache manager may access the object cache using the set of hash values to retrieve the second object from the location. If hash function does not provide collision free guarantees, the cache manager may use the signature to confirm that an object located in the cache has not only the same signature but also the same hash value.

If the cache manager determines not to access the second object in the object cache using the trainable hash function and the set of attributes of the first object, in operation 610, the cache manager may request the second object using the first object. For example, the cache manager may determine from the set of hash values for the second object is not present in the object cache. The cache manager may forward the first object for additional processing, for example, by a rules engine to obtain the second object.

In operation 612, the cache manager may receive the second object in response to the request. In operation 614, the cache manager may update the trainable hash function using the second object. The cache manager may provide the second object to a trainable hash function manager of the trainable hash function to improve identification of the relationships between the first object and the second object. In one example, the cache manager may receive a training signature for the second object. The cache manager may update the trainable hash function using the training signature for the second object.

The training signature may provide a representation of the ground truth schema for the second object that was supposed to be derived from the first object. A hash value for the second object may be generated from ground truth training signature. The second object may be placed in the object storage with the hash value as a key. This step may be triggered or may be omitted by the cache manager. For example, the derived object may be already present in the object cache, but the trainable hash function may have incorrectly derived the hash and the derived object was not located as a result. In this case, the trainable hash function may be updated or improved without putting the second object again into the object cache. Following the operation 608 to retrieve the second object from the object cache or the operation 614 to update the trainable hash function with the second object, the cache manager may then send the second object to the requestor.

Figure 7:
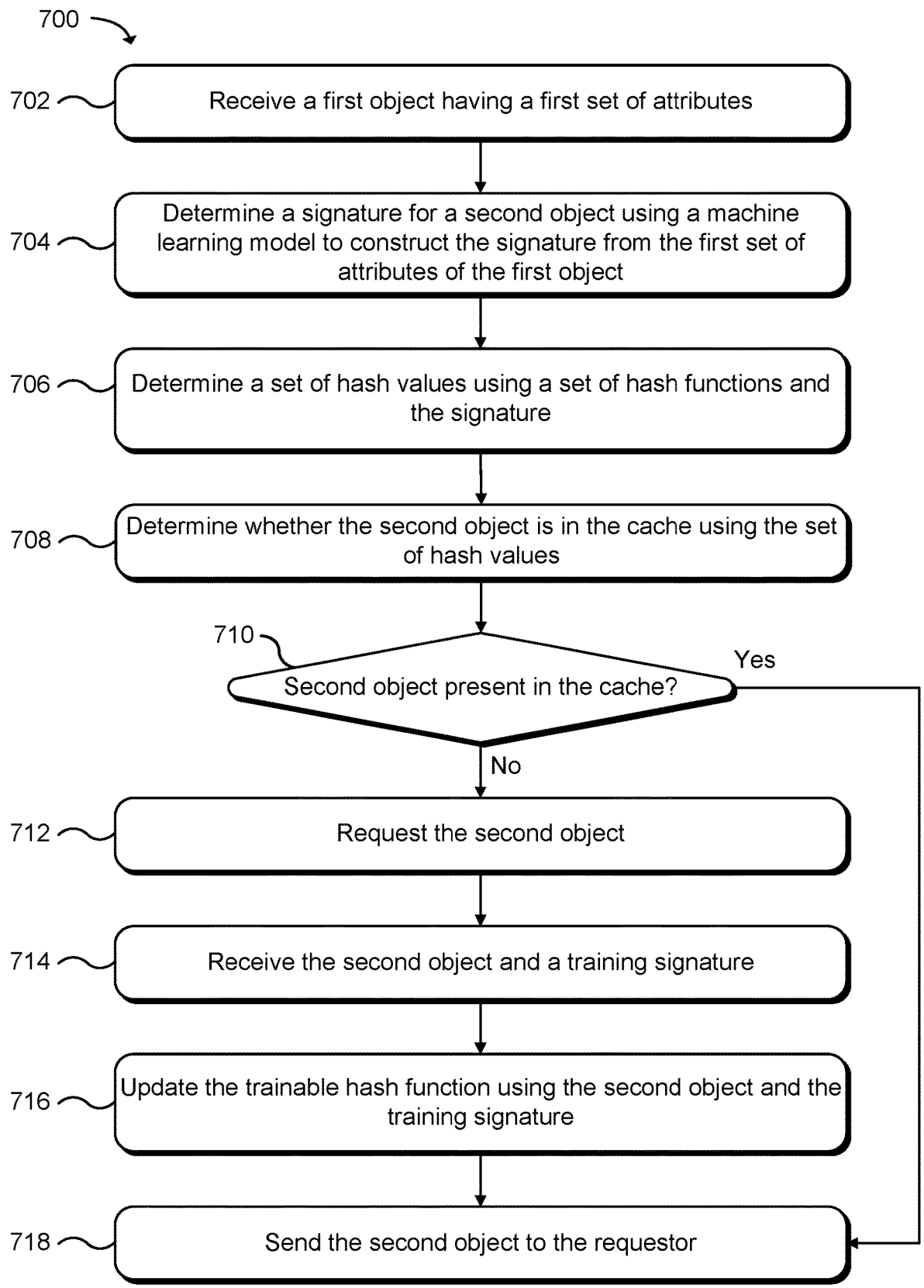
FIG. 7 is a flow diagram that illustrates an example method for accessing an object cache using a trainable hash function according to one example of the present technology.

FIG. 7 is a flow diagram that illustrates an example method 700 for accessing an object cache using a trainable hash function according to one example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 702, a trainable hash function receives a first object having a first set of attributes. In operation 704, the trainable hash function may determine a signature for a second object using a machine learning model to construct the signature from the set of attributes of the first object. For example, the machine learning model may infer or predict the expected incoming event schema to construct the signature from the set of attributes of the first object.

In operation 706, the trainable hash function may determine a set of hash values using a set of hash functions and the signature. The trainable hash function may determine the signature by selecting attributes from the first set of attributes of the first object that correspond to the expected incoming event schema. The trainable hash function may use the signature to generate a hash value to retrieve the second object. The trainable hash function may calculate the set of hash values using the selected attributes of the first object that form the signature for the second object.

In operation 708, a cache manager determines whether the second object is in the object cache using the set of hash values. In operation 710, if the cache manager determines that the second object is in the object cache, the cache manager may retrieve the second object from the object cache using the set of hash values. The cache manager may use the set of hash values to identify the location of the second object in the object cache. The cache manager may also verify that the location contains a correct derived object by comparing the signature with another signature stored in the object cache. For example, when the set of hash function do not provide collision-free guarantees. The cache manager may access the object cache using the set of hash values to retrieve the second object from the location.

If the cache manager determines that the second object is not in the object cache using the set of hash values, in operation 712, the cache manager may request the second object. In operation 714, the cache manager may receive the second object and a training signature in response to the request. The training signature may provide the expected incoming event schema and signature that should have been inferred from the first object. In operation 716, the cache manager may update the trainable hash function using the first object and the training signature. Following the operation 710 to retrieve the second object from the object cache or the operation 716 to update the trainable hash function with the training signature, the cache manager may then send the second object to the requestor.

Trainable Hash Function Systems Learning and Performance

Figure 8:
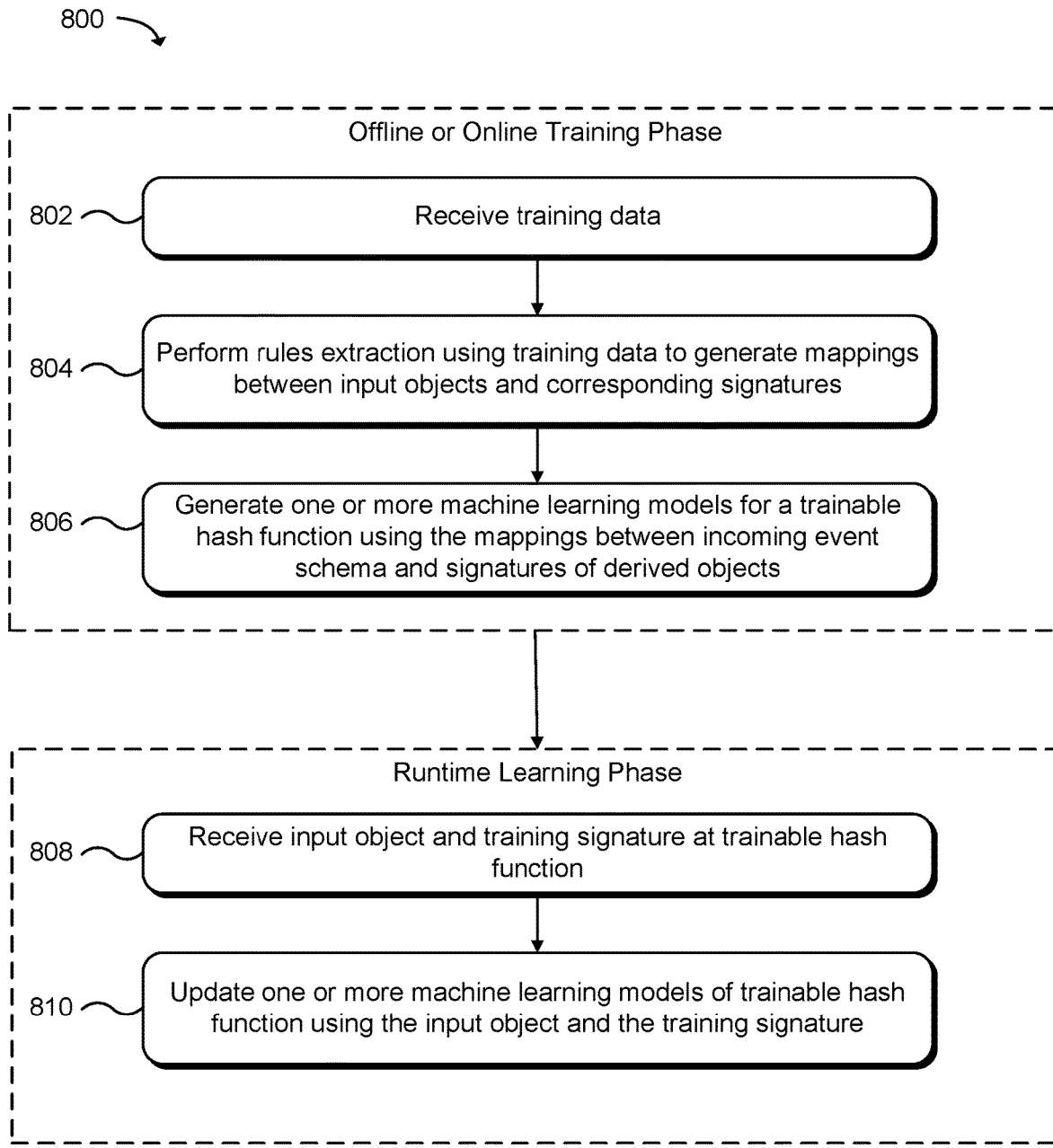
FIG. 8 is a flow diagram that illustrates an example method for training a trainable hash function according to one example of the present technology.

FIG. 8 is a flow diagram that illustrates an example method for training a trainable hash function according to one example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In this example, during an offline or online training phase, a trainable hash function system may receive training data in an operation 802. The trainable hash function system may receive the training data from one or more data sources. The training data may be manipulated by a user to emphasize features of the data that enhance prediction of relationships between input objects of variable attributes and corresponding. The training data include a data set that has been filtered to remove irrelevant data. The training data may be compressed and packaged to facilitate distribution to the trainable hash function. Training data may also be augmented with artificially generated training samples.

In operation 804, the trainable hash function system may perform rules extraction using the training data to generate one or more mappings between attributes of the input objects and corresponding signatures that uniquely identify the derived objects. The trainable hash function system may take as input the training data and one or more machine learning algorithms to generate the mappings. Some examples of the machine learning algorithms may include supervised learning and unsupervised learning, neural networks, autoencoders, linear regression, logistic regression, classification and regression trees, k-nearest neighbors, support vector machines, bagging and random forest, gradient boosting, and the like.

In operation 806, the trainable hash function system may generate one or more machine learning models for a trainable hash function using the mappings between attributes of the input objects and corresponding signatures that uniquely identify the derived objects. The machine learning models may include one or more files that describe the mathematical functions used to infer or predict the relationships between incoming event attributes (input) and corresponding derived attribute signatures (output).

During a runtime learning phase, a trainable hash function system may receive an input object and a training signature in an operation 808. The trainable hash function system may receive the input object and the training signature from the same or from different sources. For example, the trainable hash function system may receive the input object from an object cache layer manager. The trainable hash function system may receive the derived object signature (training signature) from rules engine. The trainable hash function system may receive the training signature from the rules engine, a hashing module, or from another training system.

In operation 810, the trainable hash function system may update the one or more machine learning models of the trainable hash function using the input object, and the training signature. The trainable hash function system may learn from the training signature the ground truth schema that was supposed to be predicted for the incoming object from incoming object attributes (filtering process) from the input object. The trainable hash function system may update the machine learning models as to how a set of hash values was calculated incorrectly for an attribute signature as the feedback for the particular input object.

According to one implementation of the present technology, proof of concept (POC) experiments were performed using a neural network. Specifically, Multilayer perceptron (MLP) Neural Network architecture was used. In the experiments, the Neural Network contained three hidden layers with 30 to 50 neurons. Each neuron was performing matrix vector multiplication followed by non-linear activation function. An activation function was chosen to be a ReLU (rectified linear unit). The output layer contained soft max activation function which outputs probability that the attribute should be kept (not filtered). The incoming events were vectorized prior to the training using one-hot encoding method. For one-hot encoding all possible known unique attribute values were pulled from the rules engine.

Training was performed using stochastic gradient decent algorithm (SGD). The accuracy of the trainable hash function approached nearly 100%. In one experiment, approximately 14000 configurations for a production rules were used as training data for a trainable hash function. The trainable hash function was evaluated from the same set of production rules plus additional random noise for every possible field. This means that the production rules were combined with additional attributes from the list of all possible attributes in the rules engine. The added attributes played a role of the attributes that should be filtered out by trainable hash function in order to derive only the minimum set of attributes required for the derivation. The noise played a role of a source that alters the events with additional information that needs to be filtered out.

The rules used in the POC contained internal financial reporting attributes (derived objects) for different products. The attributes describing products and actions on them (incoming objects) had internal correlation with their schema. Correlation of incoming attributes and schema can be understood as following way. It may be possible to determine what are the attributes required (schema) to get a derived object. The guess is possible by looking at incoming event attributes. For example, it may be logical that subscription product together with subscription duration together are required to derive, for example, product price or other financial attributes. However, customer_id may not be needed. In the presence of many subscription production, machine learning is able to extract that correlation between incoming subscription product event attributes and their schemas.

In the experiment, rules contained up to 20 attributes with 700 unique attribute values. Thus, the input layer of the neural network had the same 700 unique input neurons while the output layer had 20 attributes representing the probability that each attribute should be part of the schema. The example experiment counted the number of times the correct hash was calculated and the number of times the correct hash could not be found. Table 1 provides the results of the experiment.

TABLE 1

| | Rule memorization accuracy | Generalization power-ability to correctly derive hash for unseen events | Note |
|---|---|---|---|
| Correct schema predicted, correct object may be derived by hash | 99.92% | 88% | Event schema predicted correctly by trainable hash function, the hash is correct and correct derived object will be retrieved from the cache (if present) |
| Event schema predicted incorrectly, the derived object not found in the cache | 0.08% | 12% | Event schema predicted incorrectly, the hash value is incorrect and won't be found in the cache, however cache may contain correct hash with corresponding correct hash value. Object won't be derived from object but the correct object may be in the cache. Derivation will be routed to rules engine, even though, the derived object may be in the cache |
| Event schema predicted incorrectly, incorrect object is derived from the cache | 0%-guaranteed | 0%-guaranteed | Event schema predicted incorrectly, therefore, the hash value is incorrect. Impossible scenario: cache manager successfully finds derived object by the hash and returns, resulting into wrong object being returned |

The numbers were obtained from processing of 80,000 memorized events and 20,000 "unseen events." To note, the example probabilistic hash function has two possible modes: "schema prediction after memorization" and "schema prediction for unseen events." After the event has been seen, the event with its training signature can be placed into an improvement queue (e.g., data store 408). The trainable hash function may receive adjustments and the next time the average cache hit rate may be higher and the next time the average hit rate may be higher.

The Table 1 provides accuracy measures obtained during the experiment for both modes. The described modes are important characteristics of trainable hash function adaptation. The numbers mean that never seen events will likely to derive correct hash (in 88% cases). Of cause, for the first time the derived object may not be in the cache. As the result of the first time processing of unseen event, the corresponding derived object is placed to the cache.

When the incoming object is received the second time, then the probability to derive it will be 88% in average or higher (in case model improvement has been already applied). In the limit of multiple improvements for the received objects, the trainable hash function, may stabilize. Trainable hash function in its stationary state may demonstrate the accuracy to derive the right hash up to 99.92%. These numbers forms key parameters of adaptation dynamics of trainable hash function.

As results approach high accuracy through use of neural nets, the trainable hash function may expect acceptable accuracies through linear models that support analytical optimal solutions, Bayesian models that support online learning in analytical ways, or smaller neural nets with iterative online learning. The trainable hash function may also provide flexibility to clients to tune, leverage, and balance utilization of computing resources for heavy hash function calculation with hash accuracy. For example, iterative online learning may benefit from adapting to incoming traffic distribution to provide high accuracy caching.

In another example, a decision tree model may be used. The decision tree may be overfitted to seen events. This means full memorization of all seen event schemas. On one hand, this approach guarantees 100% accuracy for memorization mode (because of overfitting), but, on other hand, provides 0% accuracy for new events-no generalization. This approach might be beneficial in the case of weak correlation between attributes and schemas. If the correlation is low, more advanced ML models cannot benefit much because they cannot extract good generalization rules. An overfitted decision tree may not be effective if the number of rules is large in a rules engine, because the decision tree may become extremely big. However, more advanced ML models (like neural networks) may become beneficial when the number of rules grows. Advanced ML models may extract complex correlations well and may also memorize compactly large number of rules and keep accuracies for both modes at high levels.

Figure 9:
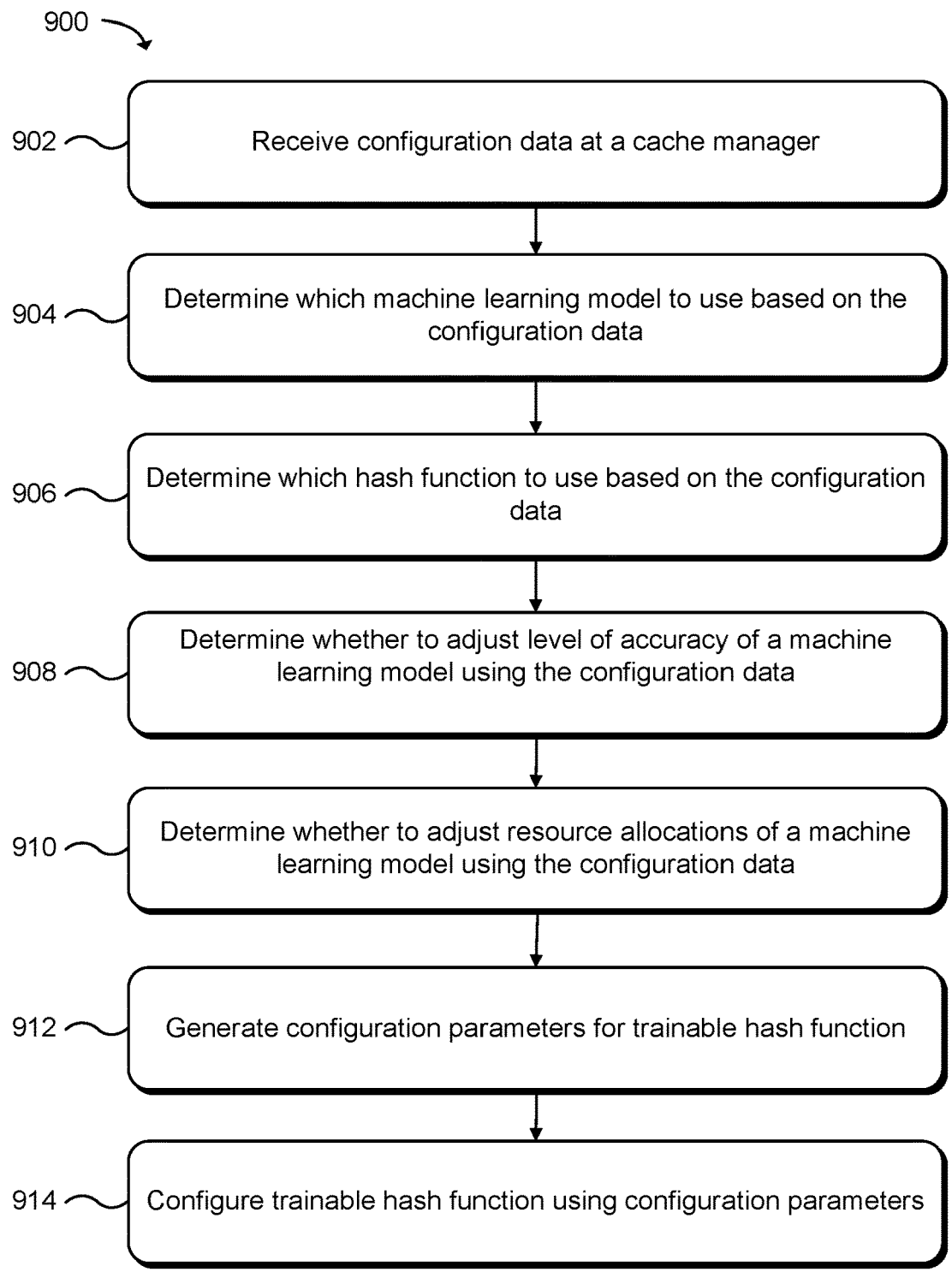
FIG. 9 is a flow diagram that illustrates an example method for configuring a trainable hash function according to one example of the present technology.

FIG. 9 is a flow diagram that illustrates an example method 900 for configuring a trainable hash function according to one example of the present technology. The method 900 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 902, a trainable hash function system may receive configuration data. The configuration data may include data used to initialize, configure, or tune a trainable hash function. The configuration data may include training data used as an input training dataset, a runtime training dataset, training signatures, and the like. The configuration data may include one or more machine learning models. The configuration data may identify which of the one or more machine learning models to use, a priority between machine learning models, an ordering of the machine learning models, and the like. The configuration data may include one or more hashing functions. The configuration data may identify which of the one or more hashing functions to use, a priority between hashing functions, an ordering of the hashing functions, and the like. The configuration data may include one or more configuration parameters for balancing accuracy of the machine learning models and computing resource utilization.

In operation 904, the trainable hash function system may determine which machine learning model to use based on the configuration data. The trainable hash function system may select one or more machine learning models based on available resource allocations, user preference, desired accuracy, and the like. In operation 906, the trainable hash function system may determine which hash function to use based on the configuration data. The trainable hash function system may select one or more hash functions based on a probabilistic data structure used by the trainable hash function to determine whether an element is a member of a set.

In another example, The trainable hash function system may select one or more hash function with collision free properties.

In operation 908, the trainable hash function system may determine whether to adjust a level of accuracy and modify complexity of a machine learning model using the configuration data. The trainable hash function system may select one or more of the machine learning models to provide a desired level of accuracy in reconstruction of an expected event schema. The trainable hash function system may lower the level of accuracy and simplify complexity of the machine learning model when the cost of a higher level of accuracy is outweighed by improved responsiveness of a processing system. The trainable hash function system may increase the level of accuracy when the cost of increased computing resources is desired to improve responsiveness to a client application. There might be other factors, not only resources and responsiveness (time). There can be derivation cost for example as a driver to go with more complex (higher accuracy, resource demanding) models.

In operation 910, the trainable hash function system may determine whether to adjust resource allocations to a machine learning model using the configuration data. The trainable hash function system may adjust computing resource capacity to provide a desired level of accuracy or responsiveness in reconstruction of an expected event schema. The trainable hash function system may increase the allocation of computing resources to increase the level of accuracy. The trainable hash function system may decrease the allocation of computing resources based on a reduction in the rate of client requests.

In operation 912, the trainable hash function system may generate one or more configuration parameters for the trainable hash function. The trainable hash function system may generate the configuration parameters using the determined level of accuracy, the determined resource allocations, the selected machine learning models (e.g., corresponding hyperparameters that provide the number of hidden layers in a neural network), the selected hash functions, and the like. The trainable hash function system may generate the configuration parameters in a configuration document, such as a JSON document, XML document, or the like.

In operation 914, the trainable hash function system may configure the trainable hash function using the configuration parameters. In one example, the trainable hash function system may include the configuration parameters, the machine learning models, the hash functions, in the configuration document. The trainable hash function system may send the configuration document to an object cache service or object cache layer to configure the trainable hash function. The trainable hash function system may enable the trainable hash function to be re-trained periodically or reconfigured for different applications or services. Trainable hash function may be also incrementally trained, so called, online training, as more incoming objects are received and processed by the cache layer. In this way trainable hash function is adjusting to the traffic that cache layer receives.

Example Computing Device

Figure 10:
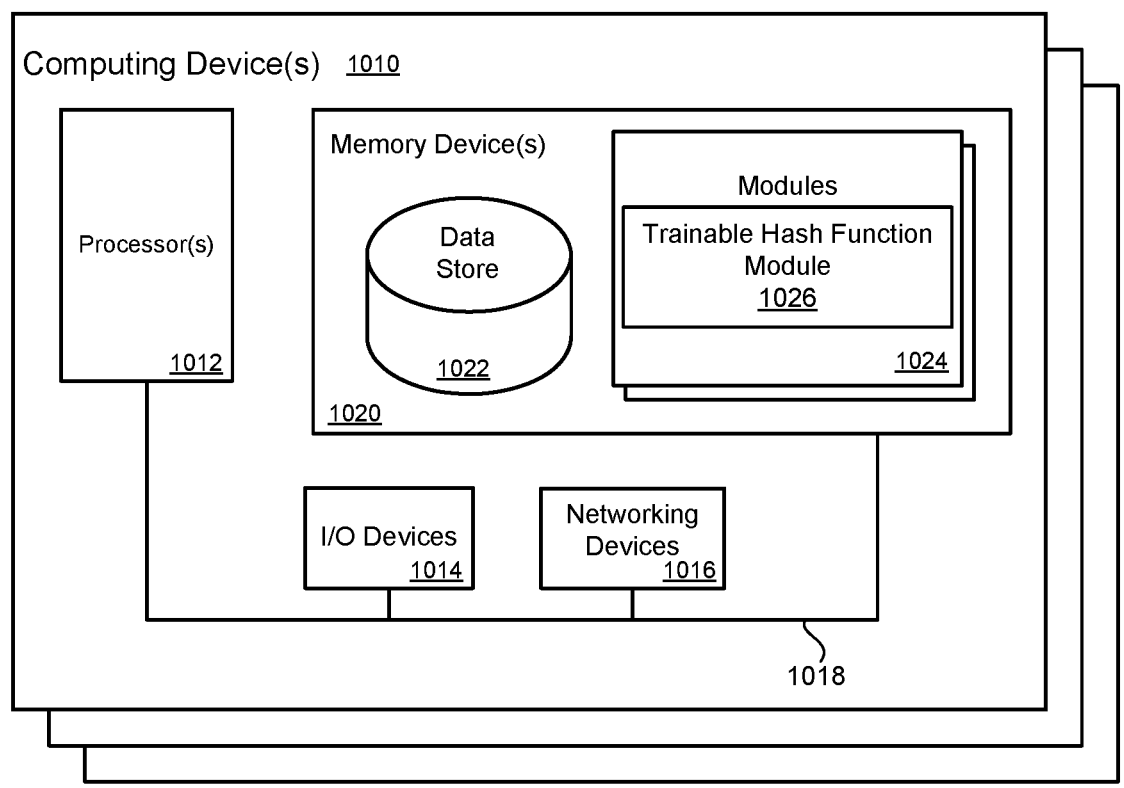
FIG. 10 illustrates one or more computing device(s) on which modules or code components of this technology may execute.

FIG. 10 illustrates one or more computing device(s) 1010 on which modules or code components of this technology may execute. A first computing device 1010 is illustrated on which a high-level example of the technology may be executed. The first computing device 1010 may include one or more processor(s) 1012 that are in communication with memory device(s) 1020. The computing device may include a local communication interface 1018 for the components in the computing device. For example, the local communication interface may be a local data bus and/or any related address or control busses as may be desired.

The memory device(s) 1020 may contain modules 1024 or code components that are executable by the processor(s) 1012 and data for the modules 1024. The modules 1024 may execute the functions described earlier. In this example, the memory device(s) 1020 include a trainable hash function module 1026. The trainable hash function module 1026 may enable an object cache layer that uses machine learning to calculate schema for objects for which the schema is variable and unknown prior to runtime.

A data store 1022 may also be located in the memory device(s) 1020 for storing data related to the modules 1024 and other applications along with an operating system that is executable by the processor(s) 1012. Other applications may also be stored in the memory device(s) 1020 and may be executable by the processor(s) 1012. Components or modules discussed in this description that may be implemented in the form of software using high programming level languages that are compiled, interpreted, or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. The networking devices 1016 and similar communication devices may be included in the computing device. The networking devices 1016 may be wired or wireless networking devices that connect to the internet, a LAN, WAN, or other computing network.

The components or modules that are shown as being stored in the memory device(s) 1020 may be executed by the processor(s) 1012. The term "executable" may mean a program file that is in a form that may be executed by a processor(s) 1012. For example, a program in a higher-level language may be compiled into machine code in a format that may be loaded into a random-access portion of the memory device(s) 1020 and executed by the processor(s) 1012, or source code may be loaded by another executable program and interpreted to generate instructions in a random access portion of the memory to be executed by a processor. The executable program may be stored in any portion or component of the memory device(s) 1020. For example, the memory device(s) 1020 may be random access memory (RAM), read only memory (ROM), flash memory, a solid-state drive, memory card, a hard drive, optical disk, floppy disk, magnetic tape, or any other memory components.

The processor(s) 1012 may represent multiple processors and the memory 1020 may represent multiple memory units that operate in parallel to the processing circuits. This may provide parallel processing channels for the processes and data in the system. The local communication interface 1018 may be used as a network to facilitate communication between any of the multiple processors and multiple memories. The local communication interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
one or more processors; and
corresponding memory to store instructions which when executed by the processor cause the one or more processors to implement:
a rules processing engine configured to:
receive queries comprising input objects; and
derive, via application of one or more of a set of rules to attributes of the input objects, a same derived output object for a plurality of different input objects having a common set of attributes, wherein at least some of the input objects have the common set of attributes in addition to other attributes; and
a cache manager to manage access to an object cache for caching objects derived by the rules processing engine to reduce requests to, or reduce object derivation operations via, the rules processing engine, the cache manager to:
receive, training data to train a machine learning model of a trainable hash function;
train, using the training data, the machine learning model of the trainable hash function to identify, from input objects having variable attributes, a set of attributes used by a set of rules of the rules processing engine to derive an output object for the input objects;
receive a first object that includes a first set of attributes to be processed using the set of rules to derive a second object having a second set of attributes;
determine, using the trained machine learning model of the trainable hash function, a signature to calculate a hash value to obtain the second object in the object cache, wherein the signature is based in part on one or more attributes in the first set of attributes of the first object being the common set of attributes identified by the trained machine learning model, and wherein the signature is a prediction of the signature that the rules processing engine would have derived for the second object via application of the set of rules;
determine, using the hash value for the second object generated based in part on the signature, whether to access the second object in the object cache or to request the second object from the rules processing engine; and
responsive to a determination to access the second object in the object cache, access, by the cache manager, the second object from the object cache when the second object is located in the object cache using the hash value.

2. The system of claim 1, wherein the instructions further cause the one or more processors to:
generate, using the trainable hash function, the hash value for the second object using the signature; and
determine presence of the second object in the object cache using the hash value.

3. The system of claim 1, wherein:
to receive training data, the instructions further cause the one or more processors to:
receive, from the rules processing engine, a training signature for the second object indicating the set of attributes of the input objects that the rules processing engine uses to derive the output object; and
to train the machine leaning model the instructions further cause the one or more processors to:
update the machine learning model of the trainable hash function using the training signature.

4. The system of claim 1, wherein the instructions further cause the one or more processors to:
request the second object from the rules processing engine when the second object is not present in the object cache;
receive the second object from the rules processing engine; and
send the second object to the object cache.

5. A method, comprising:
responsive to queries comprising input objects,
deriving, by a rules processing engine via application of one or more of a set of rules to attributes of the input objects, a same derived output object for a plurality of different input objects having a common set of attributes, wherein at least some of the input objects have the common set of attributes in addition to other attributes; and
managing, by a cache manager for the rules processing engine, access to an object cache, the object cache caching objects derived by the rules processing engine to reduce requests to, or reduce object derivation operations via, the rules processing engine;
training, using training data received by the cache manager, a machine learning model of a trainable hash function to identify a set of attributes used by a set of rules of the rules processing engine to derive an output object for input objects;
receiving, at the cache manager for the rules processing engine, a request comprising a first object having a first set of attributes;
predicting, using the trained machine learning model of the trainable hash function, a signature for a second object of cacheable objects, wherein the signature is based in part on the first set of attributes of the first object being the common set of attributes identified by the trained machine learning model, and wherein the signature is a prediction of the signature that the rules processing engine would have derived for the second object via application of the set of rules;

determining, using a hash value for the second object generated based in part on the signature, whether to access the second object in the object cache or to request the second object from a source other than the object cache; and responsive to determining to access the second object in the object cache, accessing, by the cache manager, the second object in the object cache using the signature.

6. The method of claim 5, further comprising:
identifying one or more attributes in the first set of attributes of the first object as an incoming event schema based in part on a machine learning model of the trainable hash function generated using training data indicating which attributes of the first object input to a rules processing engine are used with a set of rules to derive the second object; and
generating the signature for the second object using the one or more attributes of the first object identified by the machine learning model as the incoming event signature.

7. The method of claim 5, further comprising:
receiving training data indicating which attributes of objects input to a rules processing engine are used with a set of rules to derive the second object; and
training a machine learning model of the trainable hash function using the training data to identify one or more attributes of the first object as the signature for the second object.

8. The method of claim 5, further comprising:
generating, using the trainable hash function, a hash value for the second object using the signature; and
determining a presence of the second object in the object cache using the hash value.

9. The method of claim 8, further comprising:
determining to access the second object in the object cache when the hash value of the second object indicate the presence of the second object in the object cache.

10. The method of claim 5, further comprising:
determining not to access the second object in the object cache using the signature; and
sending the first object to the source other than the object cache to request the second object, wherein the source is a rules processing engine.

11. The method of claim 10, further comprising:
receiving a training signature from the rule processing engine; and
updating a machine learning model of the trainable hash function using the training signature and the first object.

12. The method of claim 10, further comprising:
receiving the second object and a training signature from the rule processing engine; and
caching the second object in the object cache using a hash value determined using the training signature.

13. The method of claim 5, further comprising:
determining availability of computing resources for each of a plurality of levels of accuracy to determine the signature for the second object; and
selecting a level of accuracy to determine signatures based in part on the availability of the computing resources.

14. The method of claim 5, further comprising:
determining the signature for the second object using a neural network to predict an incoming event schema from the first object.

15. The method of claim 5, further comprising:
generating a partition of objects accessed frequently by a client application in the object cache using the cache manager at the client application.

16. The method of claim 5, further comprising:
caching objects accessed frequently by a plurality of client applications in the object cache using the cache manager at a rules processing engine.

17. One or more non-transitory computer readable media storing instruction which when executed on or across one or more processors cause the one or more processors to:
manage, by a cache manager for a rules processing engine, access to an object cache, the object cache to cache objects derived by the rules processing engine to reduce requests to, or reduce object derivation operations via, the rules processing engine, wherein the rules processing engine is configured to derive a same derived object for a plurality of different input objects having a common set of attributes, and wherein at least some of the input objects have the common set of attributes in addition to other attributes;
train, based on training data received by the cache manager, a machine learning model of a trainable hash function to identify, from input objects having variable attributes, a set of attributes to be processed by a set of rules accessible to the rules processing engine to derive an output object for input objects;
receive, at the cache manager for the rules processing engine, a first object that includes a first set of attributes;
determine, using the trained machine learning model of the trainable hash function of the cache manager, a signature for a second object, wherein the signature is based in part on one or more attributes in the first set of attributes of the first object being the common set of attributes identified by the trained machine learning model, and wherein the determined signature is a prediction of the signature that the rules processing engine would have derived for the second object via application of the set of rules;
determine, using a hash value for the second object generated based in part on the signature, whether to access the second object in an object cache or to request the second object from the rules processing engine; and
responsive to a determination to access the second object in the object cache, access, by the cache manager, the second object from the object cache when the second object is located in the object cache using the hash value.

18. The one or more non-transitory computer readable media of claim 17, wherein the instructions further cause the processor to:
determine that the second object is not in the object cache using the hash value; and
send the first object to the rules processing engine to request the second object.

19. The one or more non-transitory computer readable media of claim 17, wherein the instructions further cause the processor to:
receive a training signature indicating a set of attributes of input objects that the rules processing engine uses to derive the second object; and update the machine learning model using the training signature and the first object.

20. The one or more non-transitory computer readable media of claim 17, wherein the instructions further cause the processor to:
request the second object from the rules processing engine when the second object is not present in the object cache;
receive the second object and a training signature from the rules processing engine; and
send the second object to the object cache using a hash value determined using the training signature of the second object.

* * * * *